United States Patent
Stilwell et al.

(10) Patent No.: US 11,862,360 B2
(45) Date of Patent: Jan. 2, 2024

(54) NON-CONDUCTIVE SUPPORT STANDS

(71) Applicant: Hubbell Incorporated, Shelton, CT (US)

(72) Inventors: Charles Mitchell Stilwell, Owasso, OK (US); Richard Wallace Ceass, Tulsa, OK (US)

(73) Assignee: Hubbell Incorporated, Shelton, CT (US)

(*) Notice: Subject to any disclaimer, the term of this patent is extended or adjusted under 35 U.S.C. 154(b) by 0 days.

(21) Appl. No.: 17/150,917

(22) Filed: Jan. 15, 2021

(65) Prior Publication Data

US 2021/0134493 A1     May 6, 2021

Related U.S. Application Data

(63) Continuation of application No. 15/926,776, filed on Mar. 20, 2018, now Pat. No. 10,896,774.

(Continued)

(51) Int. Cl.
| | |
|---|---|
| *F16L 1/024* | (2006.01) |
| *H01B 17/14* | (2006.01) |
| *F16M 11/08* | (2006.01) |
| *H02G 15/00* | (2006.01) |
| *H02G 3/30* | (2006.01) |
| *F16L 3/223* | (2006.01) |
| *F16L 3/06* | (2006.01) |
| *F16L 3/02* | (2006.01) |
| *F16L 25/02* | (2006.01) |
| *H02G 9/02* | (2006.01) |

(52) U.S. Cl.
CPC ............ *H01B 17/14* (2013.01); *F16L 1/0246* (2013.01); *F16M 11/08* (2013.01); *H02G 3/30* (2013.01); *H02G 15/00* (2013.01); *F16L 3/02* (2013.01); *F16L 3/06* (2013.01); *F16L 3/223* (2013.01); *F16L 25/02* (2013.01); *H02G 9/02* (2013.01)

(58) Field of Classification Search
CPC .......... H01B 17/14; H02G 3/30; H02G 15/00; H02G 9/02; F16L 1/0246; F16L 3/02; F16L 3/06; F16L 3/223; F16L 25/02; F16M 11/08
USPC ........................................................ 248/415
See application file for complete search history.

(56) References Cited

U.S. PATENT DOCUMENTS

| | | | | |
|---|---|---|---|---|
| 2,305,688 | A * | 12/1942 | De Witt | ............... H01P 7/02 |
| | | | | 174/33 |
| 2,380,692 | A * | 7/1945 | Gunnison | ................ E04B 1/36 |
| | | | | 52/126.6 |

(Continued)

FOREIGN PATENT DOCUMENTS

KR     101087990     12/2011

OTHER PUBLICATIONS

Rigid Brochure, "Pipe Stand User Guide", pp. 1-4, Feb. 2012.

(Continued)

*Primary Examiner* — Nkeisha Smith
(74) *Attorney, Agent, or Firm* — Wissing Miller LLP

(57) ABSTRACT

A support stand made of a non-conductive material and having a saddle, pedestal and a base used to support objects is provided. The pedestal supports the saddle and the base supports the pedestal. The saddle has a support member used to support objects and one or more flanges used to support objects. The saddle, pedestal and base are formed of a non-conductive material.

17 Claims, 18 Drawing Sheets

Related U.S. Application Data

(60) Provisional application No. 62/474,279, filed on Mar. 21, 2017.

(56) References Cited

U.S. PATENT DOCUMENTS

| | | | |
|---|---|---|---|
| 2,504,291 A | 4/1950 | Alderfer | |
| 3,023,990 A * | 3/1962 | Gunthel, Jr. | H01B 17/16 248/70 |
| 3,222,030 A | 12/1965 | Thorpe | |
| 3,471,968 A | 10/1969 | Letz | |
| 3,606,409 A * | 9/1971 | Hawkins, Jr. | F16B 7/1418 403/301 |
| 3,713,259 A | 1/1973 | Tkach | |
| 3,809,348 A * | 5/1974 | Di Laura | F16L 3/00 248/49 |
| 4,546,581 A * | 10/1985 | Gustafson | E02D 27/34 52/126.6 |
| 4,575,985 A * | 3/1986 | Eckenrodt | E04C 5/20 52/677 |
| 4,685,258 A * | 8/1987 | Av-Zuk | E04F 15/02452 52/126.6 |
| 5,064,971 A | 11/1991 | Bogdanow | |
| 5,561,950 A * | 10/1996 | Collins | E02D 27/32 248/354.3 |
| 5,595,039 A | 1/1997 | Lowery | |
| 5,603,187 A * | 2/1997 | Merrin | E04D 13/12 52/58 |
| 5,685,107 A * | 11/1997 | Sweet | A01K 97/10 43/21.2 |
| 5,752,679 A * | 5/1998 | Thomason | H02G 1/14 248/165 |
| 5,906,341 A * | 5/1999 | Brown | F16L 3/227 248/49 |
| 6,076,778 A * | 6/2000 | Brown | F16L 3/227 248/49 |
| 6,155,743 A * | 12/2000 | Chen | F16M 11/10 403/374.1 |
| 6,178,716 B1 | 1/2001 | Chen | |
| 6,206,613 B1 * | 3/2001 | Elkins | F16L 3/26 405/157 |
| 6,332,292 B1 | 12/2001 | Buzon | |
| 6,364,372 B1 * | 4/2002 | Marandi | F16L 21/06 285/325 |
| D466,393 S | 12/2002 | Neider et al. | |
| D466,394 S | 12/2002 | Neider et al. | |
| 6,520,456 B1 | 2/2003 | Neider et al. | |
| 6,536,717 B2 | 3/2003 | Parker | |
| 6,592,093 B2 | 7/2003 | Valentz | |
| 6,866,445 B2 | 3/2005 | Semier | |
| 7,043,869 B1 | 5/2006 | Hubbard | |
| 7,086,203 B2 | 8/2006 | Owen | |
| D560,483 S | 1/2008 | Mercier | |
| 7,481,247 B2 | 1/2009 | Friedline et al. | |
| 7,543,606 B2 | 6/2009 | Friedline et al. | |
| 7,610,728 B1 * | 11/2009 | Manocchia | E02D 27/01 248/357 |
| 7,661,240 B2 | 2/2010 | Sargent | |
| 7,906,726 B1 * | 3/2011 | Burkett | H02G 3/0418 174/68.1 |
| D649,434 S | 11/2011 | Lalancette | |
| 8,829,353 B2 | 9/2014 | Homner | |
| 8,967,555 B2 | 3/2015 | Smith | |
| D730,724 S | 6/2015 | Brown | |
| 9,231,392 B2 * | 1/2016 | Rogers | F16M 13/027 |
| 9,464,421 B2 | 10/2016 | Muderlak | |
| 9,472,936 B2 * | 10/2016 | Sousa | H02G 3/30 |
| 9,508,472 B2 * | 11/2016 | Deshaies | H01B 17/16 |
| 9,523,380 B2 * | 12/2016 | Brown | B29C 65/48 |
| 9,677,276 B2 | 6/2017 | Gilman | |
| 9,677,690 B2 | 6/2017 | Lalancette | |
| 10,428,976 B2 | 10/2019 | Matz | |
| 2003/0071177 A1 | 4/2003 | Aussiker | |
| 2004/0163334 A1 | 8/2004 | Carlson | |
| 2012/0073237 A1 * | 3/2012 | Brown | F24F 13/32 52/705 |
| 2012/0168570 A1 * | 7/2012 | Smith | F16L 3/00 248/51 |
| 2013/0152849 A1 * | 6/2013 | Yang | A63B 71/0672 116/223 |
| 2016/0131280 A1 | 5/2016 | Brown | |
| 2019/0145547 A1 | 5/2019 | Ball | |
| 2020/0304061 A1 * | 9/2020 | Jette | H02G 3/30 |

OTHER PUBLICATIONS

International Search Report and Written Opinion mailed in PCT/US18/23389 dated Jun. 18, 2018 (10 pages).

International Preliminary Report on Patentability mailed in International Application PCT/US2018/023389 dated Oct. 3, 2019.

* cited by examiner

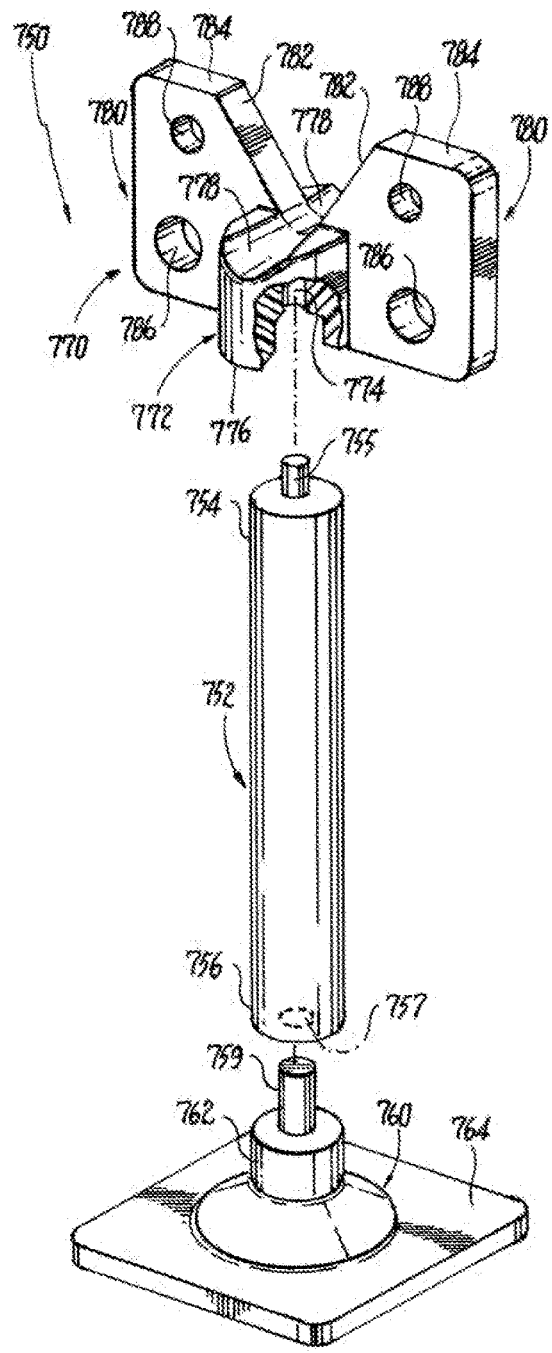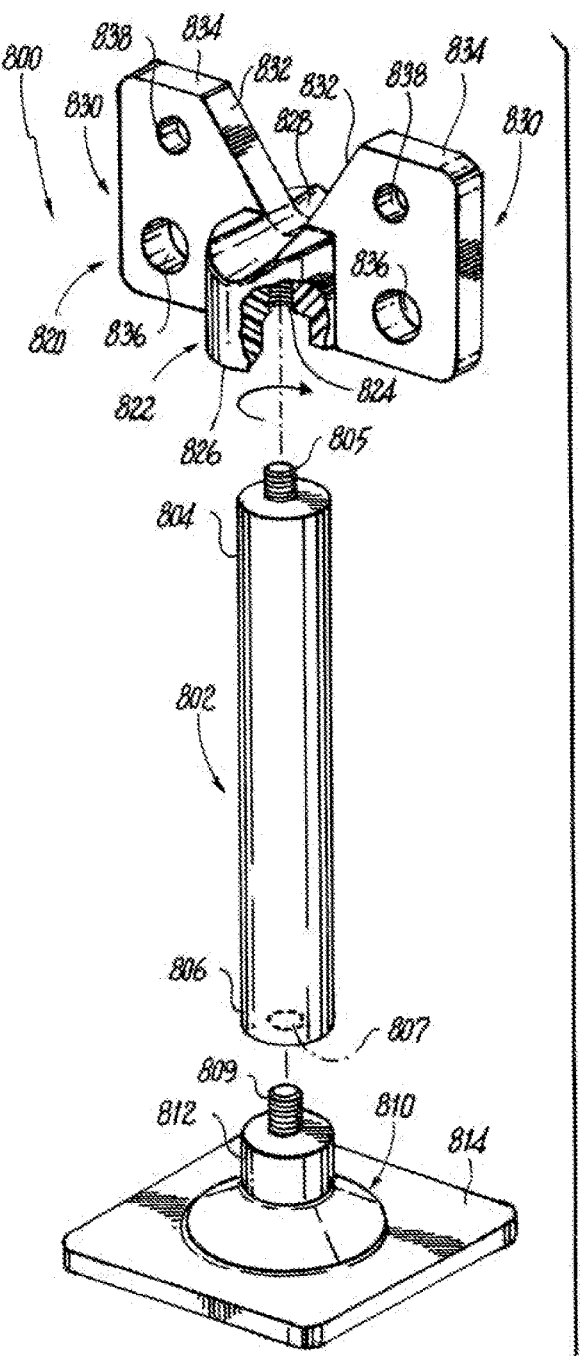
*Fig. 10*   *Fig. 11*

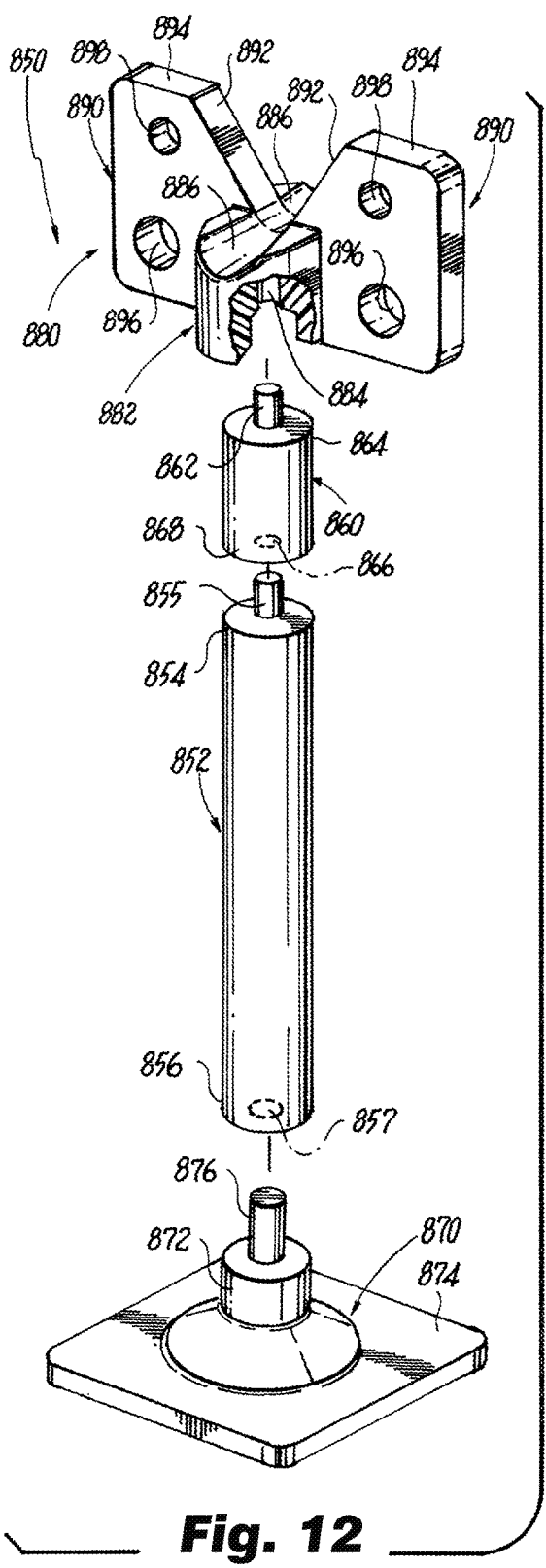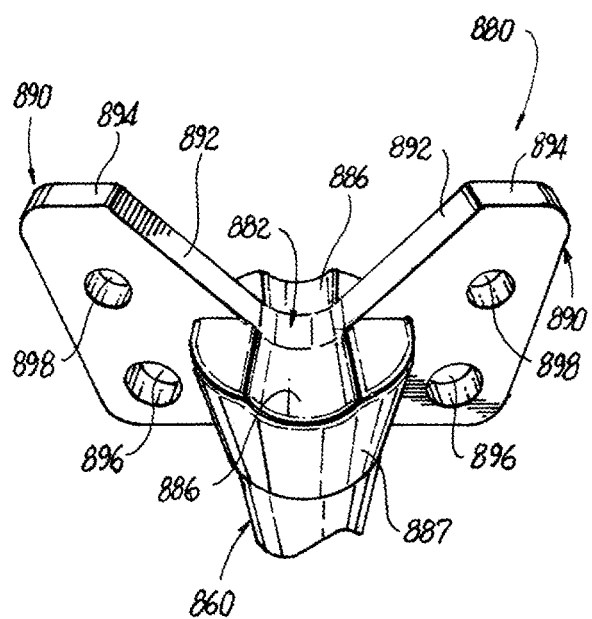
Fig. 12
Fig. 13

NON-CONDUCTIVE SUPPORT STANDS

CROSS-REFERENCE TO RELATED APPLICATIONS

This application is a continuation of co-pending application Ser. No. 15/926,776, filed Mar. 20, 2018, which claims priority to U.S. Provisional Application Ser. No. 62/474,279, filed Mar. 21, 2017 both of which are incorporated herein by reference in their entirety.

BACKGROUND

Field

The present disclosure relates to support stands for supporting objects and, more particularly, to non-conductive support stands for supporting objects.

Description of the Related Art

Various types of support devices are often used to support objects including structures and materials. Support devices are generally used to support structures and materials, such as metallic pipes often used to carry water, gas, chemicals and electrical cables, while preventing unnecessary strain from being placed on the structure or material. Metallic pipes and piping material are often arranged around large tanks carrying volatile materials such as gas, chemicals, etc. for transferring the volatile materials from the tanks to one or more destinations. Simply placing the object or objects on the ground or on blocks may create tripping or other hazards. Metallic stands are generally provided for supporting such metallic pipes and piping material above the ground. To protect from static electricity discharge, lightening and/or stray arcing situations, the metallic stands should be electrically bonded or grounded. It will be appreciated that providing an electrical bond or ground for each support structure can be labor intensive and expensive.

SUMMARY

The present disclosure provides embodiments of non-conductive support stands that can be used to support objects. In one exemplary embodiment, the support stand includes a pedestal having a first end and a second end, a saddle removably attached to the first end of the pedestal, and a base attached to the second end of the pedestal. The support stand may also include at least one shim positioned between a top of the first end of the pedestal and the saddle. The pedestal, saddle, base and shims are formed of a non-conductive or dielectric material. The saddle includes a support member, and at least one flange extending from the support member. The support member includes an orifice for receiving the first end of the pedestal, a removable cap that when removed provides access to the interior of the orifice, and a recess portion configured to receive and support an object. The at least one flange extending from the support member includes at least one aperture used to allow one or more objects to pass through the at least one flange and to support the one or more objects. The at least one flange may include at least one slot used to allow one or more objects to pass through the at least one flange and to support the one or more objects. The at least one slot may be in addition to the one or more apertures or in lieu of the one or more apertures.

In another exemplary embodiment, the support stand includes a pedestal having a first end and a second end, a saddle having a support member removably attached to the first end of the pedestal and at least one flange extending from the support member, and a base attach to the second end of the pedestal. The support stand may also include at least one shim positioned between a top of the first end of the pedestal and the support member. The pedestal, saddle and base are formed of a non-conductive or dielectric material. The support member includes an orifice for receiving the first end of the pedestal, a removable cap that when removed provides access to the interior of the orifice, and a recess portion configured to receive an object. The at least one flange includes at least one aperture used to allow one or more objects to pass through the at least one flange and to support the one or more objects. The at least one flange may include at least one slot used to allow one or more objects to pass through the at least one flange and to support the one or more objects. The at least one slot may be in addition to the one or more apertures or in lieu of the one or more apertures.

The present disclosure also provides embodiments of non-conductive bases that can form part of a support stand, or that can be used on a stand-alone basis to support objects. The non-conductive bases can be stackable so that the height of the base can be increased or decreased to fit a particular application. In one exemplary embodiment, the base includes a bottom surface and a top surface. The top surface can be configured and dimensioned to support an object, or the top surface of the base can be configured and dimensioned to receive a pedestal of a support stand. The base member is formed of a non-conductive material.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein:

FIG. 10 is an exploded perspective view of a support stand according to another illustrative embodiment of the present disclosure;

FIG. 11 is an exploded perspective view of a support stand according to another illustrative embodiment of the present disclosure;

FIG. 12 is an exploded perspective view of a support stand according to another illustrative embodiment of the present disclosure;

FIG. 13 is a perspective view of a saddle of the support stand of FIG. 12;

DETAILED DESCRIPTION

Illustrative embodiments of the present disclosure may be provided as improvements to support stands and stand-alone bases. According to an illustrative embodiment of the present disclosure one or more portions of the support stands and the bases are made of non-conductive materials.

Illustrative embodiments of the present disclosure may be provided as improvements to support stands for supporting metallic and/or conductive pipes. According to an illustrative embodiment of the present disclosure one or more portions of the pipe support stand are made of non-conductive materials.

The support stands and bases contemplated by the present disclosure are configured and dimensioned to support one or more objects. As used herein, "object" in the singular and "objects" in the plural are used to include any object. Non-limiting examples of an object include structures, materials and equipment. Non-limiting examples of structures, materials and equipment include piping, cabling and construction structures and materials. Non-limiting examples of piping, cabling and construction structures and materials include electrical conduits, electrical and communication wires and cabling, pressure air lines, pipes for fluids and gases, and other piping materials.

Figure 1:
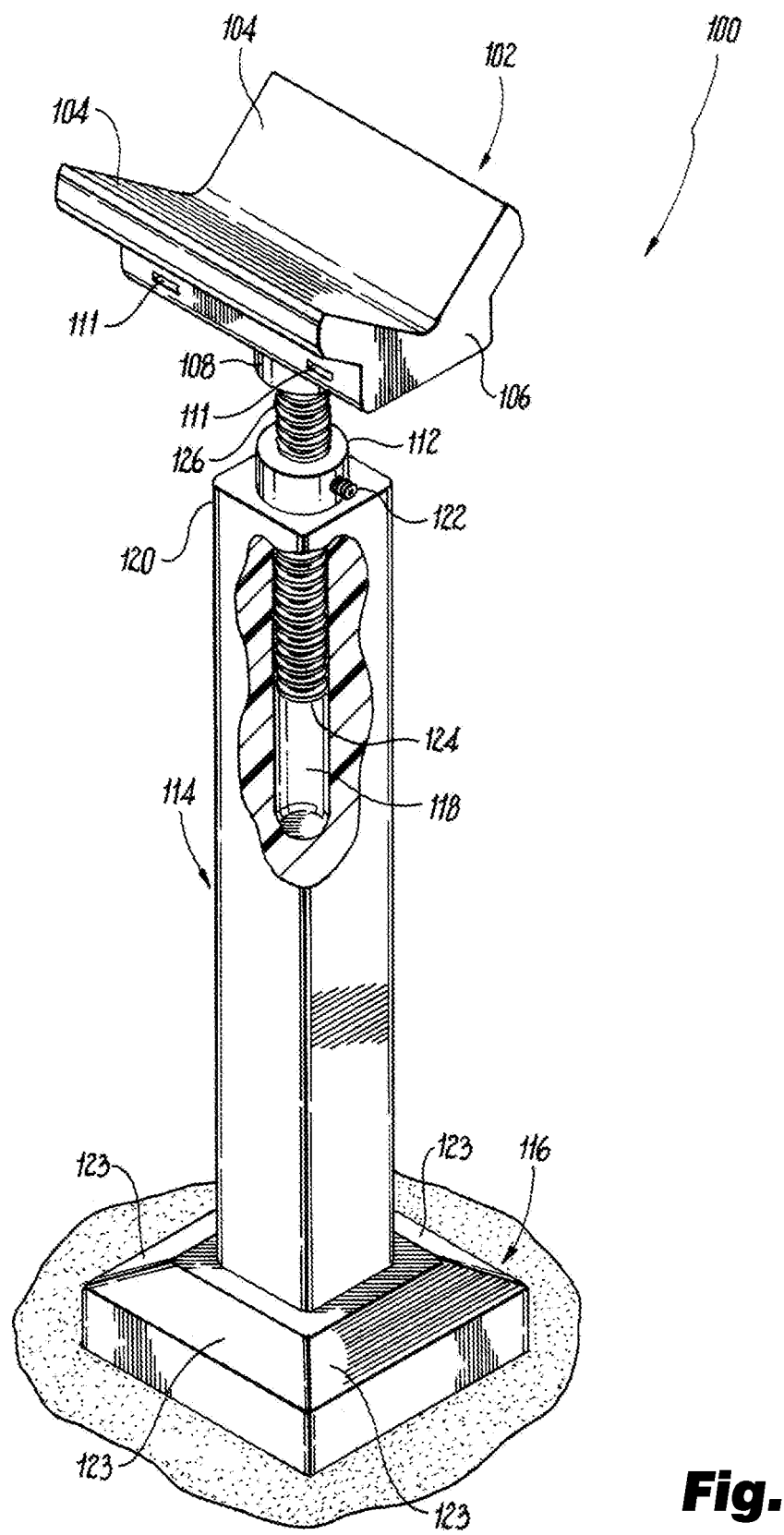
FIG. 1 is a perspective view of a support stand according to an illustrative embodiment of the present disclosure.

A support stand according to an illustrative embodiment of the present disclosure is shown in FIGS. 1 and 2 and is referred to generally as support stand 100. Support stand 100 includes a pedestal 114 having a base 116 and a saddle 102. A proximate end 126 of jack screw 110 is attached to base member 108 of saddle 102. For example, the proximate end 126 of threaded jack screw 110 may rest in a recess in base member 108. The recess in base member 108 may be threaded for receiving threaded jack screw 110. Alternatively, threaded jack screw 110 may be formed integral with base member 108. The distal end 124 of threaded jack screw 110 is received in the female threaded center portion 118 of pedestal 114. Jack screw 110 allows saddle 102 to be adjusted up and down to a desired height. Locking sleeve 112 includes a lock screw 122 for locking jack screw 110 in a desired position. Saddle 102 may have different configurations depending on a particular application. According to the illustrative embodiment depicted in FIG. 1, a V-shaped pipe stand saddle 102 is shown. Saddle 102 includes a pair of arms 104 which connect at saddle base 106. V-shaped pipe stand saddle 102 is dimensioned such that a pipe can be supported in the V. One or more slots 111 may be provided in saddle 102 dimensioned for receiving straps, e.g., tie wrap straps (not shown). The straps are slid through the slots 111 and around the object being supported by support stand 100 and joined for holding the object securely in place. It will be appreciated that saddle 102 may be provided in any suitable configuration for supporting various different types/sizes of objects. For example, saddle 102 may have a flat top for supporting various types/sizes of objects. Saddle 102 may have a roller type support for supporting objects that may move or shift. Saddle 102 may have a U-shaped support or any other shape for supporting various types of objects.

Figures 2A, 2B:
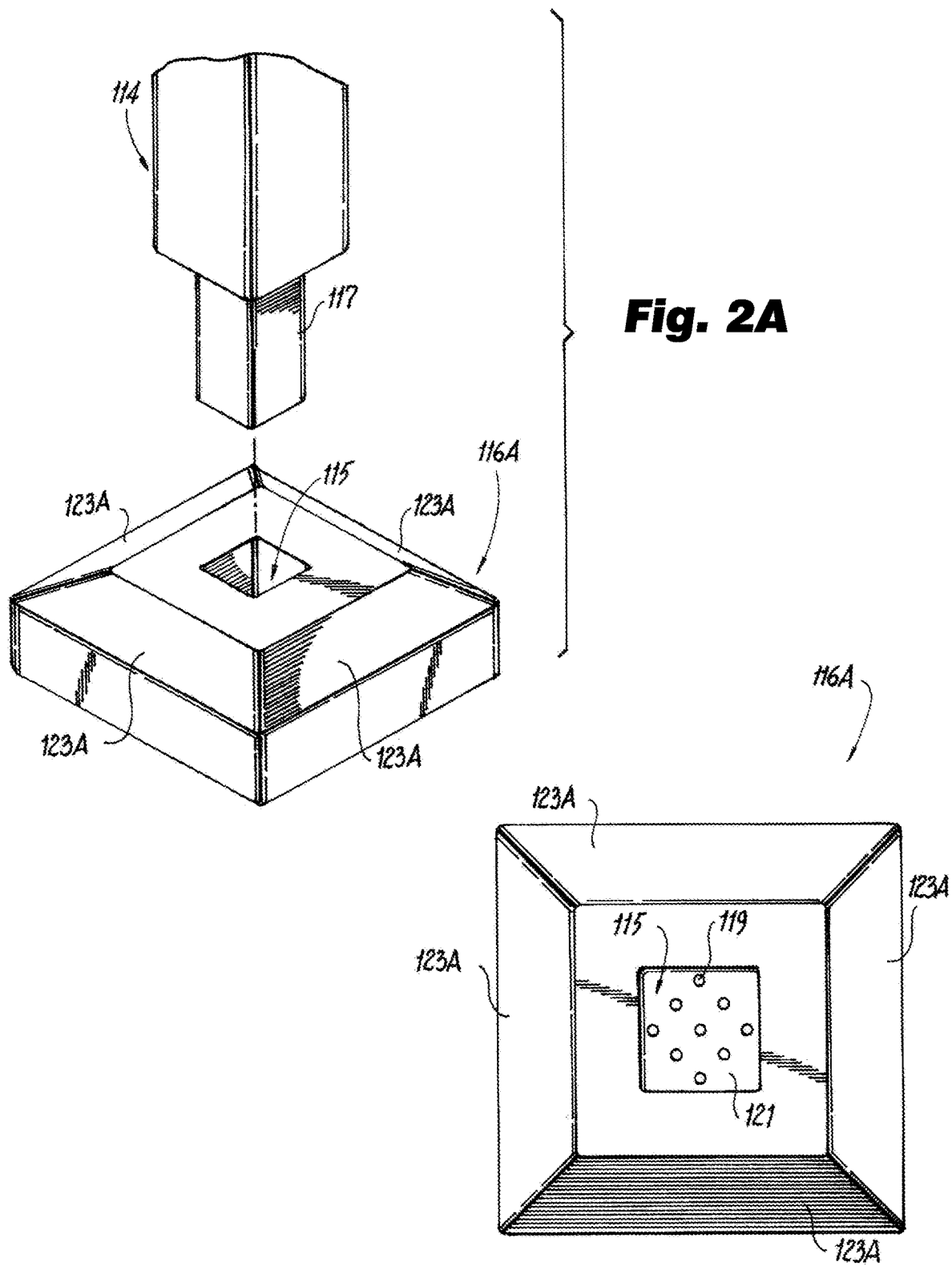
FIG. 2A is a perspective view depicting a support stand base for supporting a pedestal according to an illustrative embodiment of the present disclosure.
FIG. 2B is top view of the support stand base depicted in FIG. 2A according to an illustrative embodiment of the present disclosure.

Base 116 may be formed integral with pedestal 114 or may be a separate unit mounted to pedestal 114 in any suitable manner. For example, according to an embodiment of the present disclosure as shown in FIG. 2A, base 116A may include a female receiver portion 115 dimensioned to receive a corresponding male end 117 of pedestal 114. Although shown as square in cross-section, it will be appreciated that female receiver portion 115 and male end 117 may be provided in other shapes as appropriate, including but not limited to round, oval, rectangular, triangular, etc. Further, the male end 117 of the pedestal may be smaller in size than the pedestal, the same size as the pedestal or larger than the pedestal. As shown in FIG. 2B, the bottom of female receiver portion 115 may include a plurality of orifices 119 that extend through its bottom portion 121 for allowing drainage of water, etc. The one or more orifices 119 may be used to receive a non-conductive spike that may be driven into a substrate, e.g., the ground or flooring, for anchoring the base in a desired position.

Figure 3A:
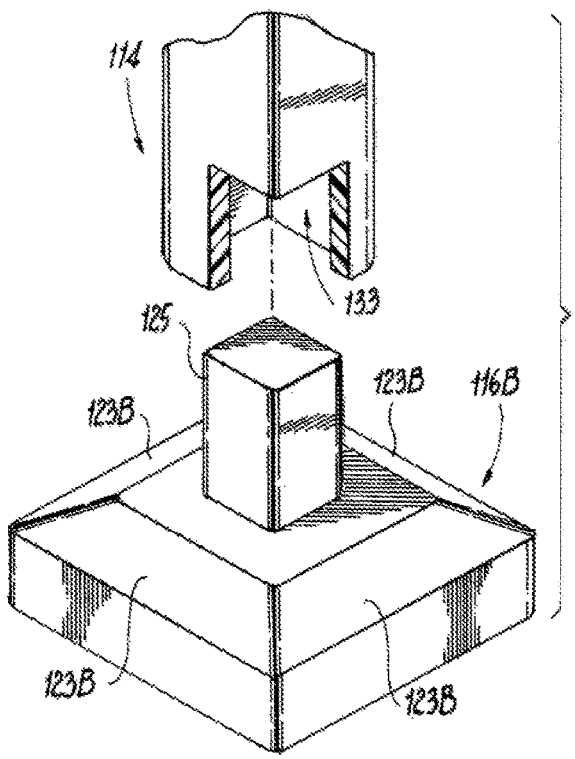
FIGS. 3A-3C are perspective views depicting support stand base according to illustrative embodiments of the present disclosure.
Figure 3B:
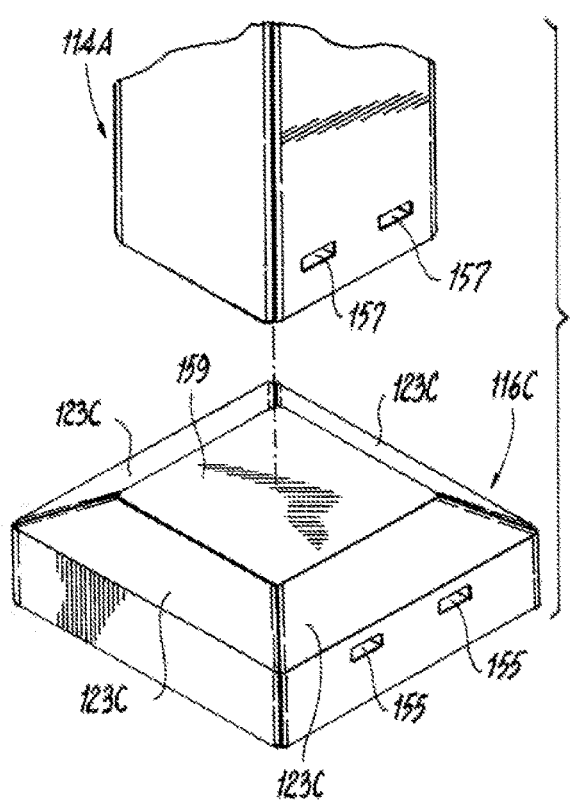
Figure 3C:
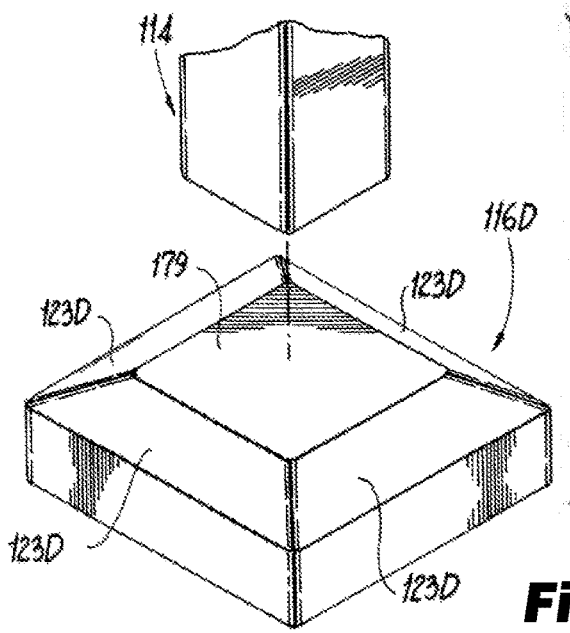

According to another illustrative embodiment of the present disclosure as shown in FIG. 3A, base 116B includes a male portion 125 extending therefrom dimensioned to receive a corresponding female end portion 133 of pedestal 114. Although shown as square in cross-section, it will be appreciated that female end portion 133 and male portion 125 may be provided in other shapes as appropriate, including but not limited to round, oval, rectangular, triangular, etc. A base according to another illustrative embodiment of the present disclosure is shown in FIG. 3B and is referred to as base 116C. Base 116C includes one or more slots 155 that extend from one side through base 116C to the other side and are dimensioned for receiving non-conductive straps, e.g., tie wrap straps (not shown). According to this embodiment of the present disclosure, the lower end of pedestal 114A includes one or more slots 157 that extend from one side through pedestal 114A and to the other side and are also dimensioned for receiving straps. Pedestal 114A rests on a top portion 159 of base 116C. A strap is then threaded through slot 155 in base 116C and then through slot 157 in pedestal 114A and the ends of the strap are then secured together thus joining the base 116C to the pedestal 114A. Although shown as square in cross-section, it will be appreciated that pedestal 114A and/or the top portion 159 of base 116C may be provided in other shapes as appropriate, including but not limited to round, oval, rectangular, triangular, etc. A base 116D according to another embodiment of the present disclosure is shown in FIG. 3C. In this embodiment, a pedestal 114 rests on the top portion 179 of base 116D and is held in place by the weight of an object resting on the support (e.g., a pipe). It will be appreciated that the shapes of the base 116 and bases 116A-116D may be other than as shown. For example, although shown as including beveled upper edges 123 (123A-123D), it will be appreciated that these edges may be provided as square corners, rounded corners, etc. as desired. Base 116 and bases 116A-116D may be provided in a shape other than square as shown. For example, base 116 and bases 116A-116D may be any suitable geometric shape including but not limited to rectangular, triangular, round, oval, etc. It will be appreciated that the shape of pedestal 114 may be other as shown. For example, instead of a square cross-sectional shape, pedestal 114 may have a circular, triangular, rectangular, etc. cross-sectional shape as suitable for a particular application. According to an embodiment of the present disclosure, saddle 102, jack screw 110, pedestal 114 and base 116 (and bases 116A-116D) are made from a non-conductive or dielectric material. Non-limiting examples of suitable non-conductive and dielectric materials include, concrete, polymer concrete, cementitious resins, fiberglass, fiberglass reinforced resins, plastics including PE (polyethylene), PVC (polyvinyl chloride) and other plastic compositions, etc. Since the support stand 100 is formed from a non-conductive or dielectric material, there is no need to ground the support.

Figure 4A:
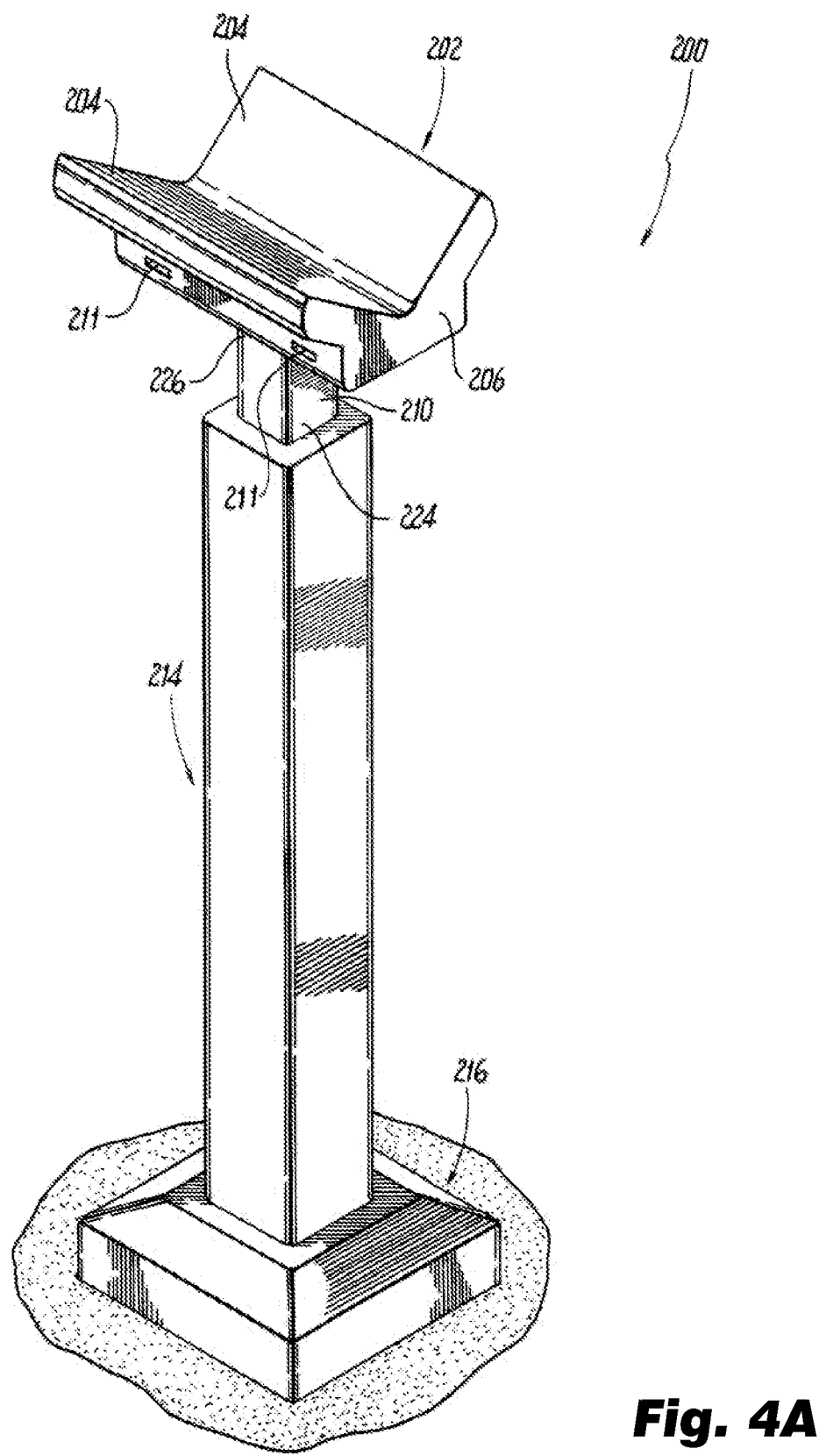
FIGS. 4A and 4B are perspective views of a support stand according to an illustrative embodiment of the present disclosure.
Figure 4B:
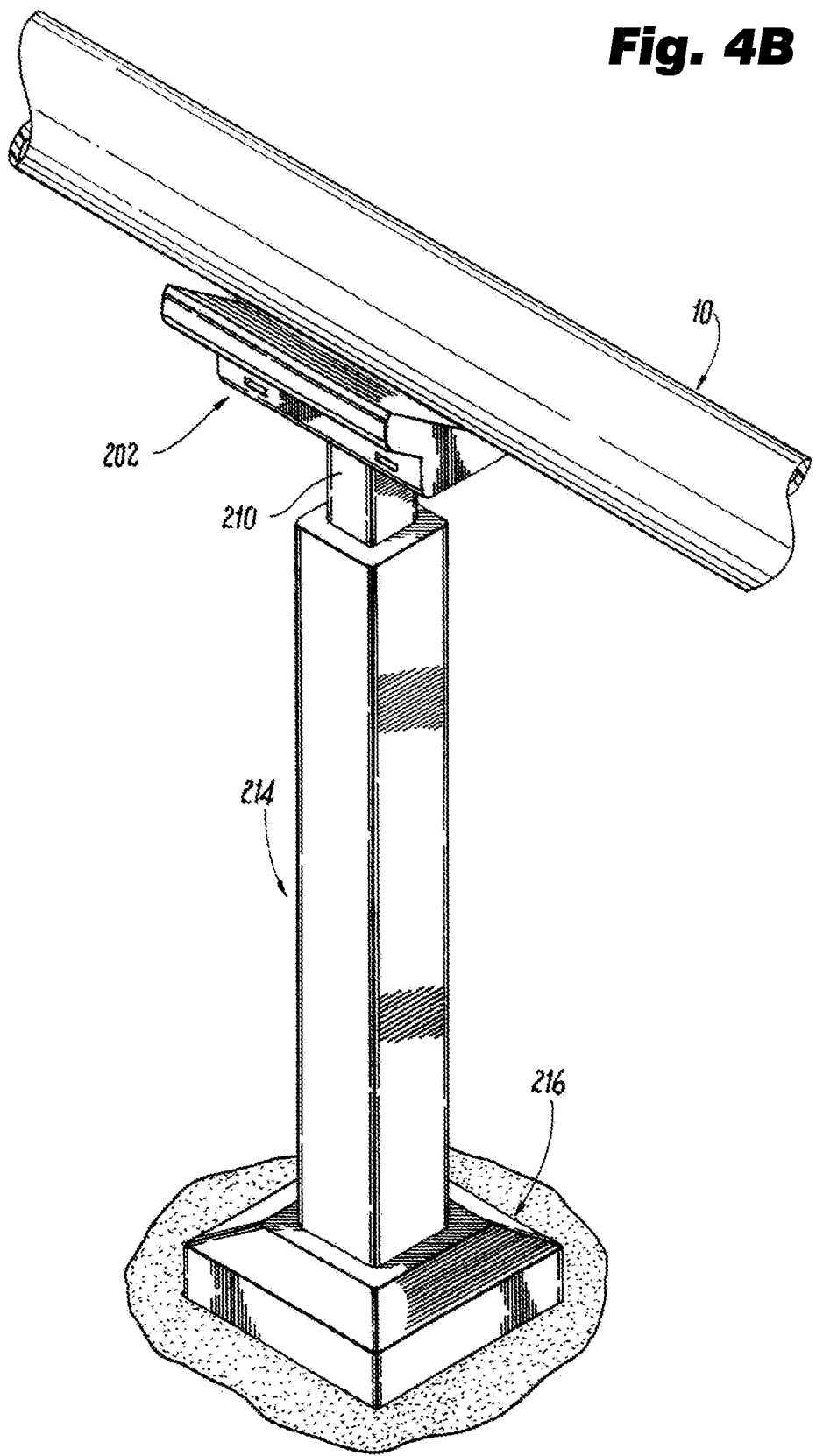

A support stand according to another illustrative embodiment of the present disclosure is shown in FIGS. 4A and 4B and is referred to generally as support stand 200. According to this embodiment, the height of support stand 200 is fixed. Of course, support stand 200 may be provided in various heights, allowing the end user to choose support stands 200 having heights suitable for a particular location and/or use of the support stand. Alternatively, the length of the pedestal may be cut to a desired length at the work site so that the assembled support stand is at the desired height. Support stand 200 includes a pedestal 214 having a base 216 and a saddle 202. Base 216 may be formed integral with pedestal 214 or may be a separate unit mounted to pedestal 214 in any suitable manner similar to those described above with respect to FIGS. 2A-3C. A proximate end 226 of connecting member 210 is attached to saddle base 206 of saddle 202. For example, the proximate end 226 of connecting member 210 may rest in a recess in saddle base 206. Alternatively, connecting member 210 may be formed integral with or otherwise permanently attached to saddle base 206. The distal end 224 of connecting member 210 is attached to pedestal end 220. For example, the distal end 224 of the connecting member 210 may rest in a recess (not shown) provided in the pedestal end 220 of the pedestal 214. Alternatively, connecting member 210 may be formed integral with or otherwise permanently attached to pedestal 214.

The saddle 202 may have different configurations depending on a particular application. According to the illustrative embodiment depicted in FIG. 4A, a V-shaped saddle 202 is shown. Saddle 202 includes a pair of arms 204 which connect at saddle base 206. V-shaped saddle 202 is dimensioned such that an object can be supported in the V as shown in FIG. 4B. One or more slots 211 may be provided in saddle 202 dimensioned for receiving straps, e.g., tie wrap straps (not shown), that can be slid through the slots 211 and around the object being supported by support stand 200 and joined for holding the object securely in place. It will be appreciated that saddle 202 may be provided in any suitable configuration for supporting various different types/sizes of objects. For example, saddle 202 may have a flat top for supporting various types/sizes of construction objects. Saddle 202 may have a roller type support for supporting objects that may move or shift. Saddle 202 may have a U-shaped support or any other shape for supporting various types of objects. It will be appreciated that the shape of pedestal 214 may be other than as shown. For example, instead of a square cross-sectional shape, pedestal 214 may have a circular, triangular, rectangular, etc. cross-sectional shape. According to an embodiment of the present disclosure, saddle 202, connecting member 210, pedestal 214 and base 216 are made from a non-conductive or dielectric material. Non-limiting examples of suitable non-conductive or dielectric materials used for forming the support stand 200 include concrete, polymer concrete, cementitious resins, fiberglass, fiberglass reinforced resins, plastics including PE (polyethylene), PVC (polyvinyl chloride) and other plastic compositions, etc. Since the support stand 200 is formed from a non-conductive or dielectric material, there is no need to ground the support.

Figures 5A, 5B:
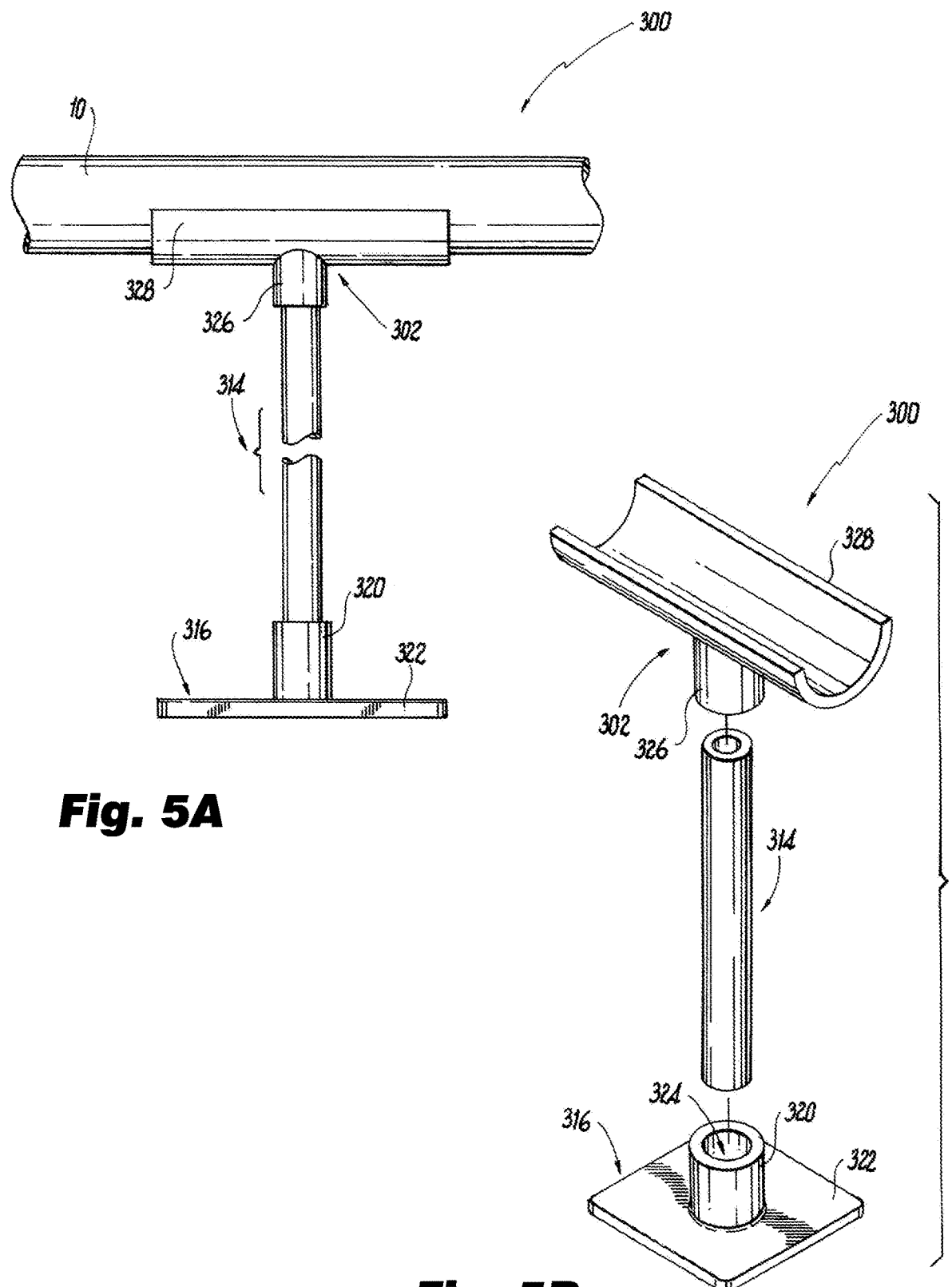
FIG. 5A is a side view of a support stand according to an illustrative embodiment of the present disclosure.
FIG. 5B is a perspective view of the support stand depicted in FIG. 5A according to an illustrative embodiment of the present disclosure.
Figure 5C:
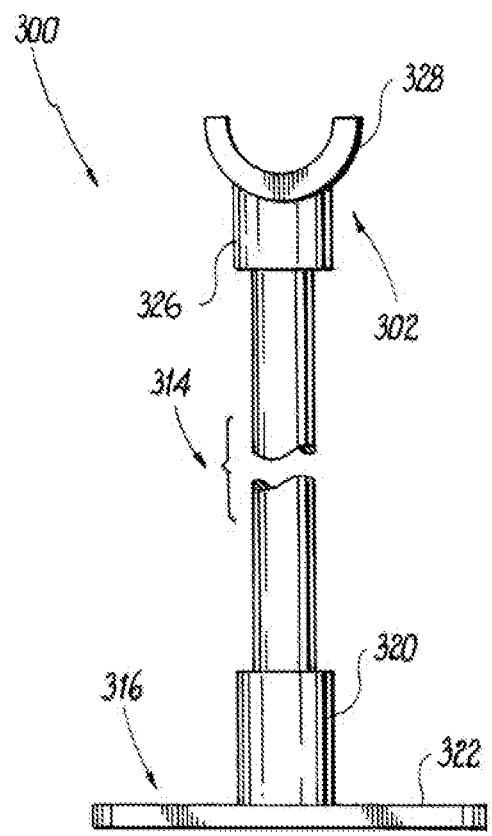
FIG. 5C is a front view of the support stand depicted in FIG. 5A according to an illustrative embodiment of the present disclosure.
Figures 5D, 5E:
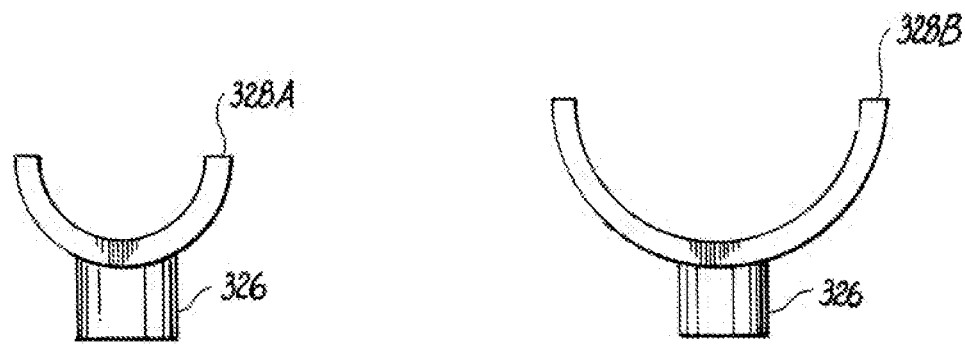
FIGS. 5D and 5E are front views depicting saddle variations of the support stand depicted in FIG. 5A according to illustrative embodiments of the present disclosure.

A support stand according to another illustrative embodiment of the present disclosure is shown in FIGS. 5A-5E and is referred to generally as support stand 300. According to this embodiment, the height of support stand 300 is fixed. Of course, support stand 300 may be provided in various heights, allowing the end user to choose support stands 300 having heights suitable for a particular location and/or use of the support stand. Alternatively, the length of the pedestal may be cut to a desired length at the work site so that the assembled support stand is at the desired height. Support stand 300 includes a pedestal 314 having a base 316 and a saddle 302. Base 316 includes a tubular section 320 mounted to a platform 322 in any suitable manner. Base 316 may be formed as a single unit by injection molding. Alternatively, tubular section 320 may be glued or welded, e.g., heat or chemical welded, or mechanically fastened to the platform 322. Saddle 302 is formed from a tubular section 326 having a U-shaped support member 328 mounted thereto. Saddle 302 may be formed as a single unit by injection molding. Alternatively, tubular section 326 may be glued or welded, e.g., heat or chemical welded, or mechanically fastened to the member 328. Pedestal 314 is a section of pipe-like material having a suitable length providing support stand 300 with a height for a particular location and/or use of the support stand. Pedestal 314 may be cut by the end user to a suitable length at the work site to provide an appropriate height for support stand 300. Pedestal 314 has an outside diameter suitable for being received in tubular section 326 of saddle 302 and tubular section 320 of base 322. The support stands shown in FIGS. 5A-5E provide support for one or more objects being supported in this type of U-shaped support. As shown in FIGS. 5D and 5E, the U-shaped support members 328A (FIG. 5D) and 328B (FIG. 5E) may be suitably dimensioned for the size of the object, e.g., pipe diameter, to be supported. The support stand 300, i.e., the saddle 302, base 316 and pedestal 314, are made from a non-conductive or dielectric material. Non-limiting examples of suitable non-conductive or dielectric materials used for forming the support stand 300 include concrete, polymer concrete, cementitious resins, fiberglass, fiberglass reinforced resins, plastics including PE (polyethylene), PVC (polyvinyl chloride) and other plastic compositions, etc. Since the support stand 300 is formed from a non-conductive or dielectric material, there is no need to ground the support.

Figures 6A, 6B, 6C:
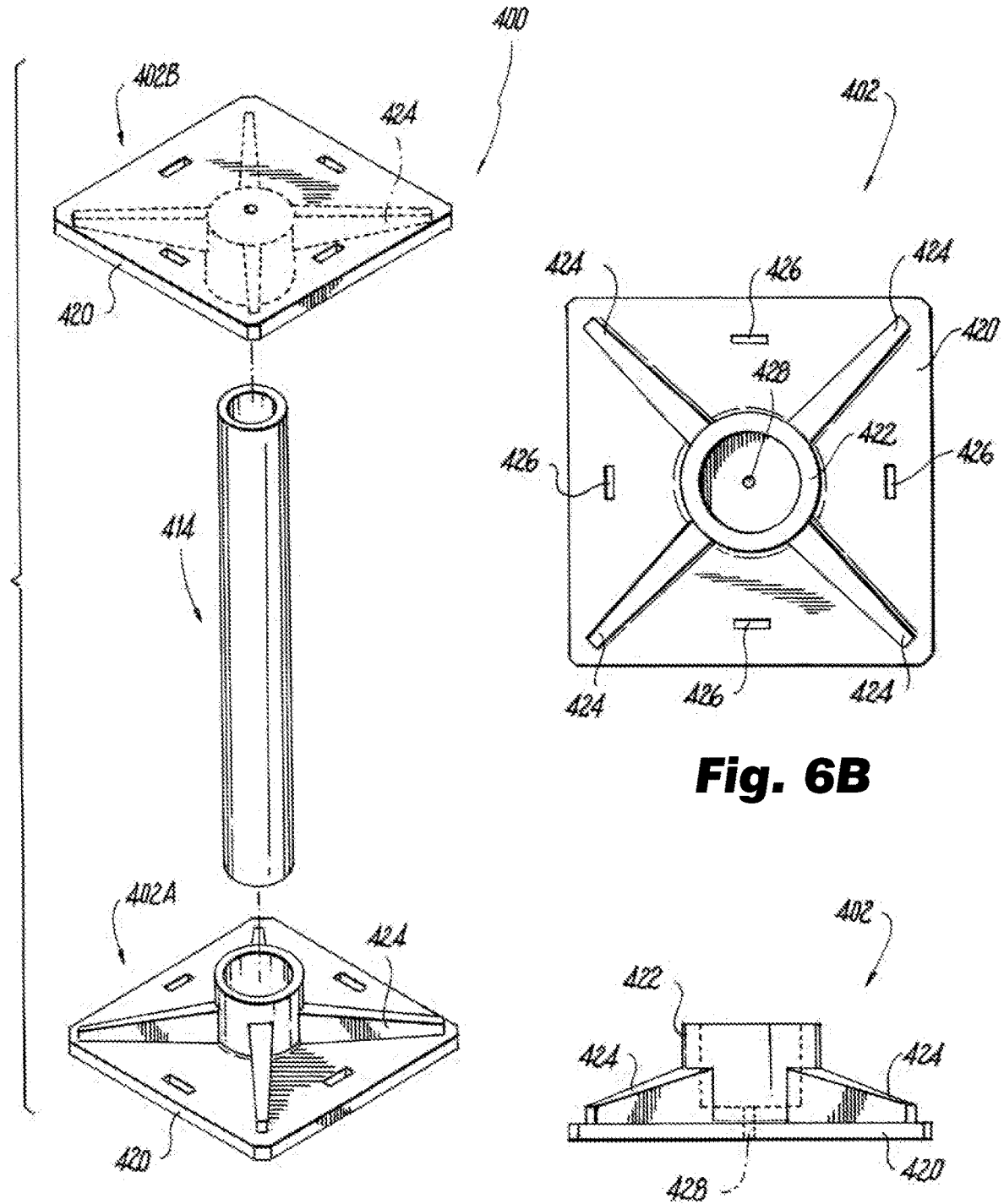
FIG. 6A is an exploded perspective view of a support stand according to an illustrative embodiment of the present disclosure.
FIG. 6B is a top view of a unit forming a saddle and a base of the support stand depicted in FIG. 6A according to an illustrative embodiment of the present disclosure.
FIG. 6C is a side view of the unit forming the saddle and the base as shown in FIGS. 6A, 6B according to an illustrative embodiment of the present disclosure.

A support stand according to another illustrative embodiment of the present disclosure is shown in FIGS. 6A-6C and is referred to generally as support stand 400. According to this embodiment, the height of support stand 400 is fixed. Of course, support stand 400 may be provided in various heights allowing the end user to choose support stands 400 having heights suitable for a particular location and/or use of the support stand. Alternatively, the length of the pedestal may be cut at the work site to a desired length so that the assembled support stand is at the desired height. Support stand 400 includes a pedestal 414, a base member 402A and a saddle member 402B. According to an illustrative embodiment of the present disclosure, base member 402A and saddle member 402B are similar and interchangeable. As shown in FIGS. 6B and 6C, members 402 (402A, 402B) include a base plate 420, tubular member 422 and at least one support member 424. One or more drainage orifices 428 may be provided in base plate 420 within tubular member 422 as shown. One or more notched orifices 426 may also be provided in base plate 420 for allowing non-conductive stakes to be driven there through and into a substrate, e.g., the ground or flooring, supporting base member 402A. Notched orifices 426 may also be used for allowing bolts to be passed there through and into an object being supported by saddle member 402B. The inner diameter of tubular member 422 is dimensioned for receiving pedestal 414. As noted, the pedestal 414 may be cut by the end user to a suitable length to provide an appropriate height for support stand 400. The support stand 400 is formed from a non-conductive or dielectric material. Non-limiting examples of suitable non-conductive or dielectric materials used for forming the support stand 400 include concrete, polymer concrete, cementitious resins, fiberglass, fiberglass reinforced resins, plastics including PE (polyethylene), PVC (polyvinyl chloride) and other plastic compositions, etc. Since the support stand 400 is formed from a non-conductive or dielectric material, there is no need to ground the support stand.

Figure 7:
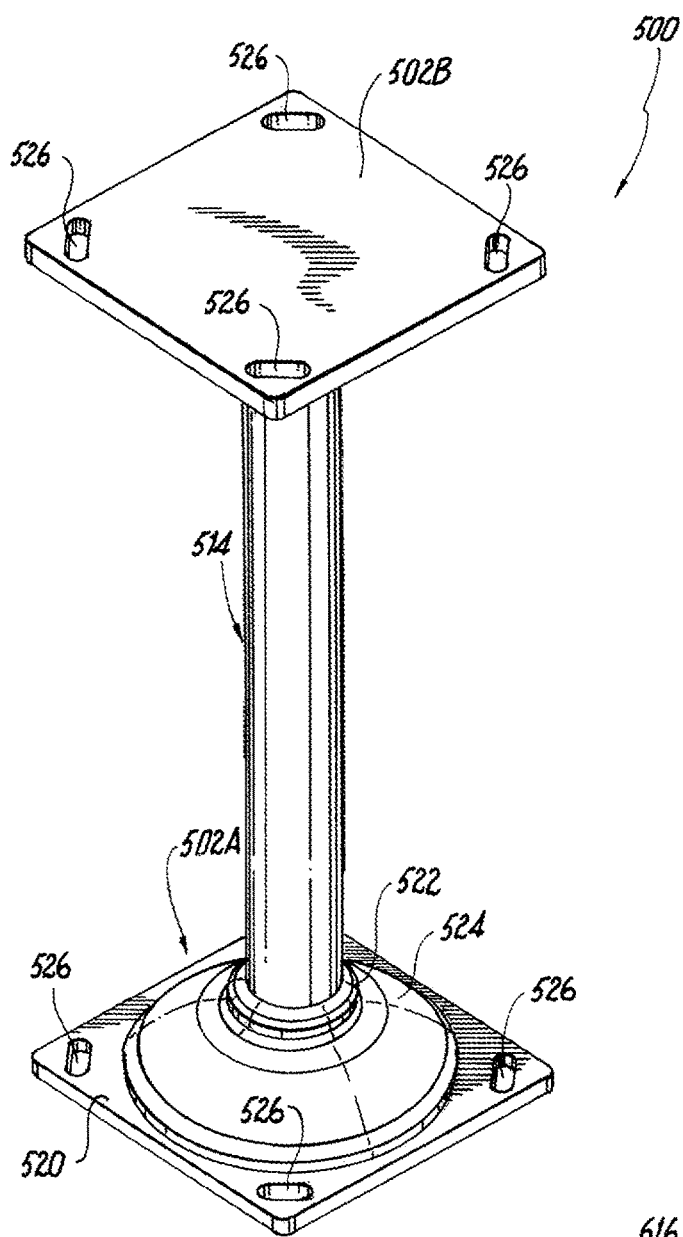
FIG. 7 is a perspective view of a support stand according to an illustrative embodiment of the present disclosure.

A support stand according to another illustrative embodiment of the present disclosure is shown in FIG. 7 and is referred to generally as support stand 500. According to this embodiment, the height of support stand 500 is fixed. Of course, support stand 500 may be provided in various heights allowing the end user to choose support stands 500 having heights suitable for a particular location and/or use of the support stand. Alternatively, the length of the pedestal may be cut to a desired length at the work site so that the assembled support stand is at the desired height. Support stand 500 includes a pedestal 514, a base member 502A and a saddle member 502B. According to an illustrative embodiment of the present disclosure, base member 502A and saddle member 502B are similar and are interchangeable. Members 502 (502A, 502B) include a base plate 520, tubular member 522 and circular support member 524. Although not shown, one or more drainage orifices may be provided in base plate 520 within tubular member 522. One or more notched orifices 526 may also be provided in base plate 520 for allowing non-conductive stakes to be driven there through and into a base supporting base member 502A. Notched orifices 526 may also be used for allowing bolts to be passed there through and into an object being supported by saddle member 502B. The inner diameter of tubular member 522 is dimensioned for receiving pedestal 514. As noted, the pedestal 514 may be cut by the end user to a suitable length to provide an appropriate height for support stand 500. The support stand 500 is formed from a non-conductive or dielectric material. Non-limiting examples of suitable non-conductive or dielectric materials used for forming the support stand 500 include concrete, polymer concrete, cementitious resins, fiberglass, fiberglass reinforced resins, plastics including PE (polyethylene), PVC (polyvinyl chloride) and other plastic compositions, etc. Since the support stand 500 is formed from a non-conductive or dielectric material, there is no need to ground the support stand.

Figure 8:
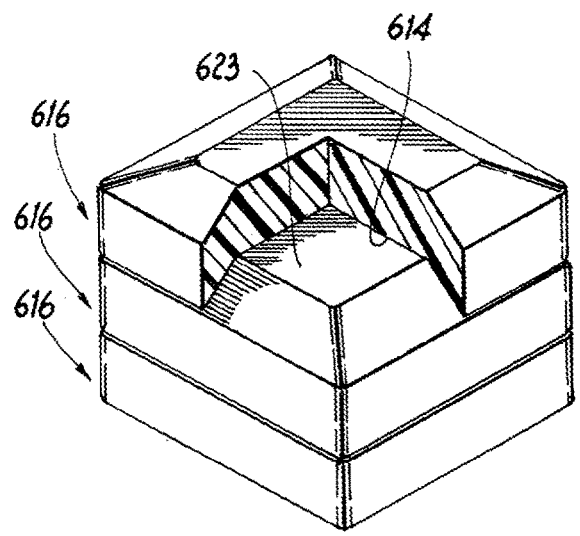
FIG. 8 is a side view of a plurality of stacked bases according to an illustrative embodiment of the present disclosure.

According to embodiments of the present disclosure, the bases described herein may be used as stand-alone support stands. The bases described herein may be stackable to achieve a desired height to support objects. For example, as shown in FIG. 8, each base 616 has a bottom surface 614 that is an inverse impression of the top surface 623 of the base. Two or more bases 616 may be stacked together by the end user until a desired height is achieved. The stacked bases may interlock to maintain the position of the bases relative to each other. According to an embodiment of the present disclosure, each base is made from a non-conductive or dielectric material. Non-limiting examples of suitable non-conductive or dielectric materials used for forming the support stand 500 include concrete, polymer concrete, cementitious resins, fiberglass, fiberglass reinforced resins, plastics including PE (polyethylene), PVC (polyvinyl chloride) and other plastic compositions, etc. Since the base is formed from a non-conductive or dielectric material, there is no need to ground the base.

Figure 9:
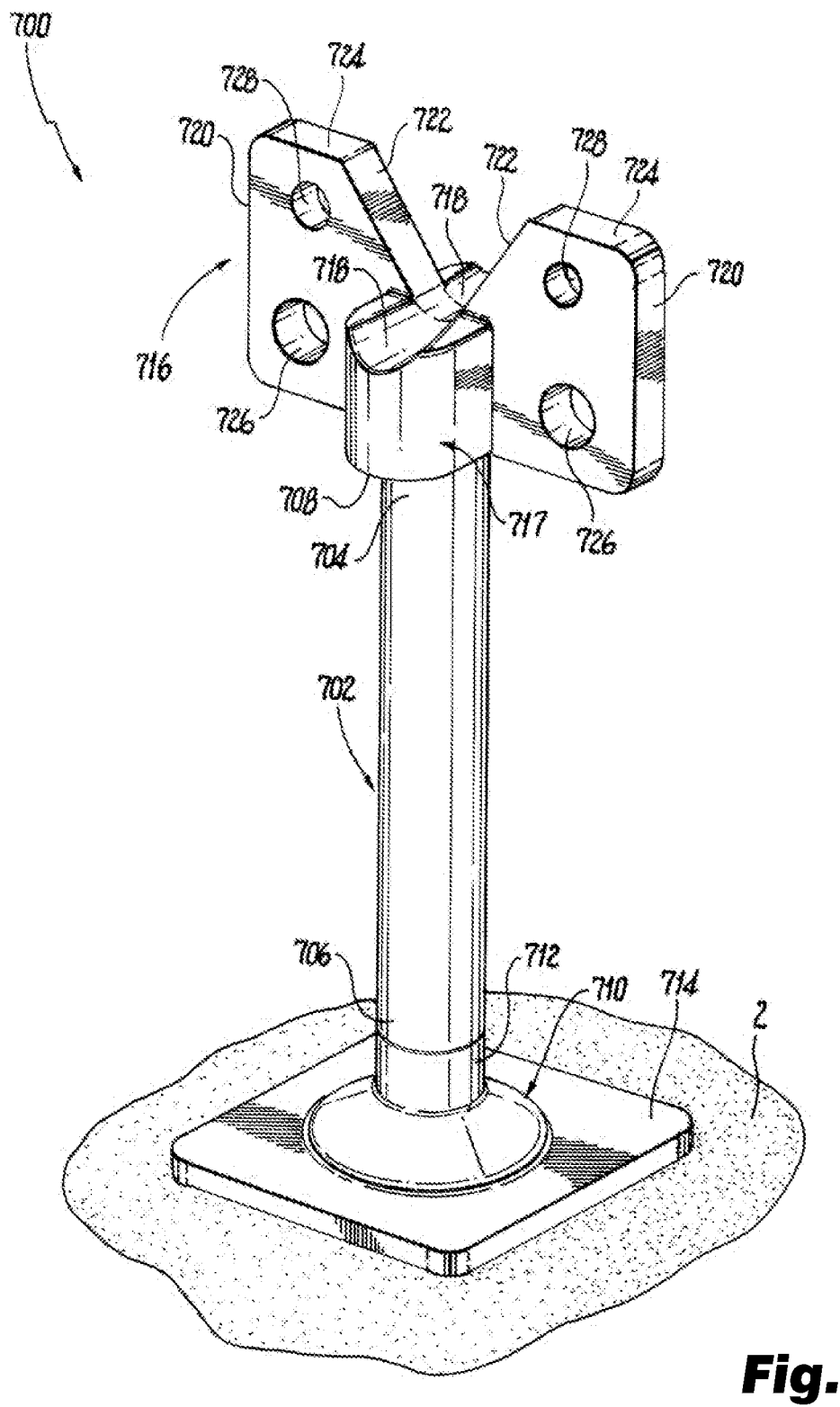
FIG. 9 is a perspective view of a support stand according to another illustrative embodiment of the present disclosure.

A support stand according to another illustrative embodiment of the present disclosure is shown in FIG. 9 and is referred to generally as support stand 700. The support stand 700 may be made from any suitable non-conductive or dielectric material. Non-limiting examples of suitable non-conductive or dielectric materials used for forming the support stand 700 include concrete, polymer concrete, cementitious resins, fiberglass, fiberglass reinforced resins, plastics including PE (polyethylene), PVC (polyvinyl chloride) and other plastic compositions, etc.

The support stand 700 includes a pedestal 702, a base 710 and a saddle 716. In this exemplary embodiment, the pedestal 702 is a fixed length pedestal 702 so that support stand 700 has a fixed height. The support stand 700 may be provided with fixed length pedestals 702 having various heights allowing the end user to choose a support stand 700 having a height suitable for a particular application. Alternatively, the length of the pedestal 702 may be cut to a desired length so that the assembled support stand 700 is at the desired height. The base 710 may include a platform 714 providing a relatively large surface area contacting the ground or flooring 2. The saddle 716 includes a support member 717 and one or more flanges 716 extending from the support member. The flanges 716 may be secured to the support member 717 or the flanges may be monolithically formed with the support member. In this exemplary embodiment, an end 706 of pedestal 702 is joined to an end 712 of base 710, and an opposite end 704 of pedestal 702 is joined to an end 708 of the support member 717 of the saddle 716.

Continuing to refer to FIG. 9, the support member 717 may include a recessed portion 718 that may be a curved recessed to conform to the shape of the object, e.g., a pipe, being supported by support member 717. However, the recessed portion 718 may have any shape that conforms to the object being supported, such as a rectangular or square shape. The flanges 720 include edges 722 extending diagonally from an upper edge 724 toward the support member 717. The diagonal edges 722 and recessed portion 718 serve to form a U-shaped, V-shaped or other shaped opening, and act as a guide for placement of objects on the support member 717. Each flange 720 may include one or more support apertures 726 and 728 that can be used to support one or more objects, such as electrical conduits, electrical and communication wires and cabling, pressure air lines, pipes for fluids and gases, and other piping materials. The support apertures 726 and 728 may have the same diameter or different diameters.

According to the embodiment of FIG. 9, the pedestal 702 may be formed integrally with base 710 and saddle 716. According to other illustrative embodiments of the present disclosure, support stands may be formed by joining two or more individual sections. For example, a support stand according to another illustrative embodiment is shown in FIG. 10, and is referred to as support stand 750. The support stand 750 may be made from any suitable non-conductive or dielectric material. Non-limiting examples of suitable non-conductive or dielectric materials used for forming support stand 750 include concrete, polymer concrete, cementitious resins, fiberglass, fiberglass reinforced resins, plastics including PE (polyethylene), PVC (polyvinyl chloride) and other plastic compositions, etc.

The support stand 750 includes a pedestal 752, a base 760 and a saddle 770. In this exemplary embodiment, the pedestal 752 includes a pin 755 extending from end 754 and an orifice 757 formed in end 756. The pin 755 may be formed integrally with pedestal 752 or may be removably attached to pedestal 752. The base 760 may include a base extension 762 and a platform 764. The base extension 762 extends from base 760 and includes a pin 759 extending therefrom. The pin 759 may be formed integrally with base extension 762 or the pin 759 may be removably attached to the base extension 762. The pin 759 has an outer diameter slightly smaller than an inner diameter of orifice 757 formed in pedestal 752 to permit the pin 759 to fit within the orifice 757. The platform 764 of the base 760 provides a relatively large surface area for contacting the ground or flooring. The saddle 770 includes a support member 772 and one or more flanges 780 extending from the support member. The flanges 780 may be secured to the support member 772 or the flanges may be monolithically formed with the support member. The support member 772 includes an orifice 774 formed at end 776 and a recessed portion 778 in a top surface of the support member. The diameter of the orifice 774 is preferably slightly larger than the outer diameter of the pin 755 extending from the end 754 of the pedestal 752 so that the pin 755 can fit within the orifice 774 when assembled. In this exemplary embodiment, the saddle 770 is capable of rotating 360 degrees about pin 755 to accommodate the support of objects in any desired direction. The recessed portion 778 of the support member 772 may include a curved recessed surface, as seen in FIG. 10, to conform to the shape of the object, e.g., a pipe, being supported by support member 772. However, the recessed portion 778 may have any shape that conforms to the object being supported, such as a rectangular or square shape. Each flange 780 includes an edge 782 extending diagonally from an upper edge 784 toward the support member 772. The diagonal edges 782 and recessed portion 778 serve to form a U-shaped, V-shaped or other shaped opening, and act as a guide for placement of objects on the support member 772. Each flange 780 may include one or more support apertures 786 and 788 that can be used to support one or more objects, such as electrical conduits, electrical and communication wires and cabling, pressure air lines, pipes for fluids and gases, and other piping materials. The support apertures 786 and 788 may have the same diameter or different diameters.

The pedestal 752, base 760 and saddle 766 of the support stand 750 can be stored and transported disassembly and then assembled on site. Assembly can be completed by inserting pin 759 of base 760 into orifice 757 of pedestal 752, and by inserting pin 755 of pedestal 752 into orifice 774 of saddle 770.

A support stand according to another illustrative embodiment of the present disclosure is shown in FIG. 11 and is referred to as support stand 800. The support stand 800 may be made from any suitable non-conductive or dielectric material. Non-limiting examples of suitable non-conductive or dielectric materials used for forming support stand 800 include concrete, polymer concrete, cementitious resins, fiberglass, fiberglass reinforced resins, plastics including PE (polyethylene), PVC (polyvinyl chloride) and other plastic compositions, etc.

The support stand 800 includes a pedestal 802, a base 810 and a saddle 820. In this exemplary embodiment, the pedestal 802 includes a threaded pin 805 extending from end 804 and an orifice 807 including a threaded inner surface formed in end 806. The threaded pin 805 may be formed integrally with pedestal 802 or may be removably attached to pedestal 802. The base 810 may include a base extension 812 and a platform 814. The base extension 812 extends from base 810 and includes a threaded pin 809 extending therefrom. The threaded pin 809 may be formed integrally with the base extension 812 or the threaded pin 809 may be may be removably attached to the base extension 812. The threaded pin 809 is configured to fit within the threaded orifice 807 formed in pedestal 802 to couple the base 810 to the pedestal 802. The saddle 820 includes a support member 822 and one or more flanges 830 extending from the support member. The flanges 830 may be secured to the support member 822 or the flanges may be monolithically formed with the support member. The support member 822 has a threaded orifice 824 formed at end 826 and a recessed portion 828 in a top surface of the support member. The threaded pin 805 is configured to fit within the threaded orifice 824 to couple the saddle 820 to the pedestal 802. The recessed portion 828 may include a curved recessed surface, as shown in FIG. 11, to conform to the shape of the object, e.g., a pipe, being supported by support member 822. However, the recessed portion 828 may have any shape that conforms to the object being supported, such as a rectangular or square shape. Each flange 830 includes an edge 832 extending diagonally from an upper edge 834 toward the support member 822. The diagonal edges 832 and recessed portion 828 serve to form a U-shaped, V-shaped or other shaped opening, and act as a guide for placement of objects on the support member 822. Each flange 830 may include one or more support apertures 826 and 828 that can be used to support one or more objects, such as electrical conduits, electrical and communication wires and cabling, pressure air lines, pipes for fluids and gases, and other piping materials. The support apertures 826 and 828 may have the same diameter or different diameters.

The pedestal 802, saddle 816 and base 810 of support stand 810 can be stored and transported disassembled and then assembled on site. Assembly can be completed by screwing threaded pin 809 of base 810 into orifice 807 of pedestal 802, and by screwing threaded pin 805 of pedestal 802 into threaded orifice 824 of the saddle 820.

A support stand according to another illustrative embodiment of the present disclosure is shown in FIG. 12, and is referred to as support stand 850. The support stand 850 may be made from any suitable non-conductive or dielectric material. Non-limiting examples of suitable non-conductive or dielectric materials used for forming support stand 850 include concrete, polymer concrete, cementitious resins, fiberglass, fiberglass reinforced resins, plastics including PE (polyethylene), PVC (polyvinyl chloride) and other plastic compositions, etc.

The support stand 850 includes a pedestal 852, one or more pedestal extensions 860, a base 870 and a saddle 880. The pedestal 852 includes a pin 855 extending from end 854 and an orifice 857 formed in end 856. The pin 855 may be formed integrally with pedestal 852 or may be removably attached to pedestal 852. Each pedestal extension 860 includes a pin 862 extending from end 864 and an orifice 866 in end 868. The pin 862 may be formed integrally with pedestal extension 860 or may be removably attached to pedestal extension 860. The one or more pedestal extensions 860 may be provided in various lengths allowing one or more pedestal extensions 862 to be added to pedestal 852 for achieving a desired overall height of the support stand 850. The orifice 866 preferably has a diameter that is slightly larger than the outer diameter of the pin 855 extending from pedestal 852 to permit the pin 855 to fit within the orifice 866 when assembled, as described below. The base 870 may include a base extension 872 and a platform 874. The base extension 872 extends from base 870 and includes a pin 876 extending therefrom. The pin 876 may be formed integrally with base extension 872 or may be removably attached to base extension 872. Preferably, the pin 876 has an outer diameter slightly smaller than an inner diameter of orifice 857 formed in pedestal 852 to permit the pin 876 to fit within the orifice 857 when assembled, as described below.

Referring to FIGS. 12 and 13, the saddle 880 includes a support member 882 and one or more flanges 890 extending from the support member. The flanges 890 may be secured to the support member 882 or the flanges may be monolithically formed with the support member. The support member 882 includes an orifice 884 formed in a lower portion 887 of the support member and a recessed portion 886 on an upper surface of the support member. The orifice 884 preferably has a diameter that is slightly larger than the outer diameter of the pin 862 extending from pedestal extension 860 to permit the pin 862 to fit within the orifice 884 when assembled, as described below. In this exemplary embodiment, the saddle 880 is capable of rotating 360 degrees about pin 862 to accommodate the support of objects in any desired direction. The recessed portion 886 of the support member 882 may be a curved recessed to conform to the shape of the object, e.g., a pipe, being supported by central support member 882. However, the recessed portion 886 may have any shape that conforms to the object being supported, such as a rectangular or square shape. Each flange 890 includes an edge 892 extending diagonally from an upper edge 894 toward the recessed portion 886 of the support member 882. The diagonal edges 892 and recessed portion 886 serve to form a U-shaped or V-shaped opening, and act as a guide for placement of objects on the support member 882. Each flange 890 may also include one or more support apertures 896 and 898 that can be used to support one or more objects, such as electrical conduits, electrical and communication wires and cabling, pressure air lines, pipes for fluids and gases, and other piping materials. The support apertures 896 and 898 may have the same diameter or different diameters.

The pedestal 852, pedestal extension 860, base 870 and saddle 880 of the support stand 850 can be stored and transported disassembled and then assembled on site. Assembly can be completed by inserting pin 876 of base 870 into orifice 857 of pedestal 852, by inserting pin 855 of pedestal 852 into orifice 866 of pedestal extension 860, and by inserting pin 862 of pedestal extension 860 into orifice 884 of saddle 880.

It will be appreciated that the pin 876 of the base 870 and the orifice 857 of the pedestal 852 may be threaded as described above with respect to the embodiment depicted in FIG. 11 so that the base 870 may be releasably secured to the pedestal 852 by threading the pin 876 into the orifice 857. Similarly, the pin 855 of the pedestal 852 and the orifice 866 of the pedestal extension 860 may be threaded as described above with respect to the embodiment depicted in FIG. 11 so that the pedestal extension may be releasably secured to the pedestal by threading the pin 855 into the orifice 866. Similarly, the pin 862 of the pedestal extension 860 and the orifice 884 of the saddle 890 may be threaded as described above with respect to the embodiment depicted in FIG. 11 so that the saddle may be releasably secured to the pedestal extension by threading the pin 862 into the orifice 884.

Figure 14:
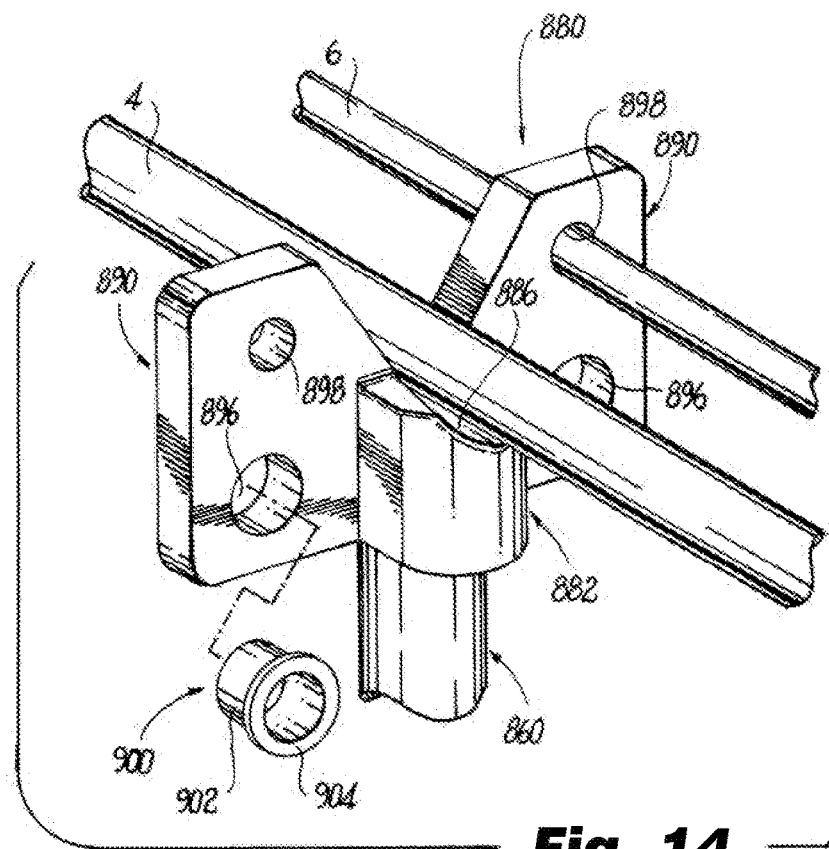
FIG. 14 is a perspective view of the saddle of FIG. 12, illustrating an object resting on a support member of the saddle and an object passing through an aperture in a flange of the saddle.
Figure 15:
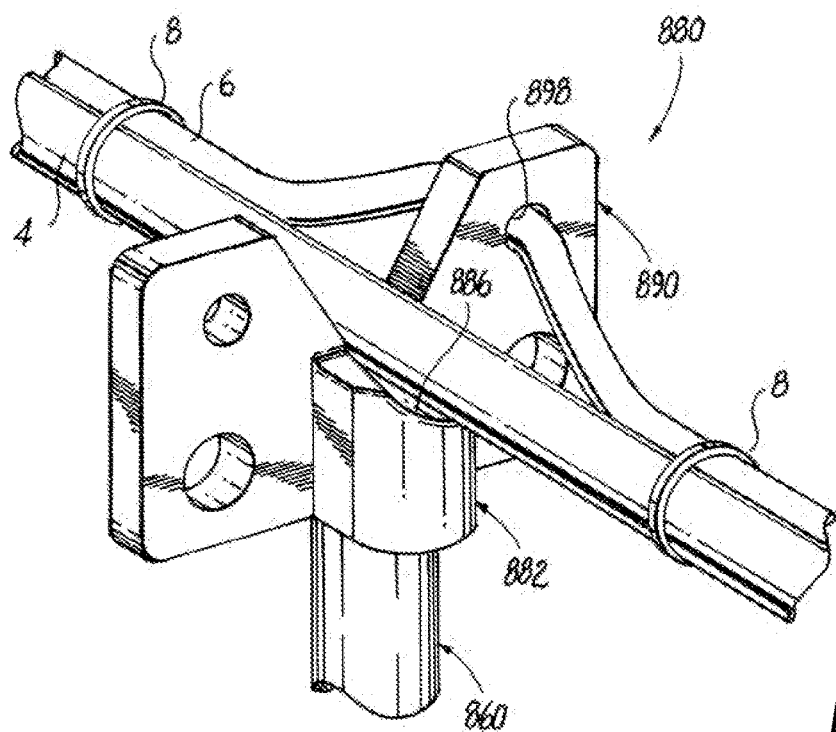
FIG. 15 is a perspective view of the saddle of FIG. 12, illustrating an object resting on a support member of the saddle and an object passing through an aperture in a flange of the saddle and secured to the object resting on the support member.

Referring now to FIGS. 14 and 15, additional illustrative embodiments of a portion of a support stand including the saddle 880 of FIG. 12 is shown. In the illustrative embodiment of FIG. 14, an object 6 extends through and rests in one of the support apertures 898 in one of the flanges 890 and an object 4 rests on the recessed portion 886 of the support member 882. It will be appreciated that many support stands may be provided along the run of objects 4 and 6. For example, objects 4 and 6 may be pipes, conduits and/or wires extending from point A to point B. Depending on the distance between point A and point B, one or more support stands may be provided for supporting the objects. Object 6 may be fed through a support aperture 896 or 898 in a flange 890 and/or rest on a recessed portion 886 of one or more support stands 850 provided between point A and point B. Object 4 may rest on the recessed portion 886 and/or be fed through a support aperture in a flange 890 of the one or more support stands provided between point A and point B. Depending on a particular application, it may be desirable to provide protection for an object passing through a support aperture 896 or 898 in the saddle 880 to minimize damage to the object, e.g., chafing, etc. In addition, it might be desirable depending on a particular application to reduce the size of one or more support apertures 896 and/or 898 passing through a flange 890 of the saddle 880 to provide a more snug and secure fit for an object passing there through. In these instances, a grommet 900 may be provided. The grommet 900 includes a first portion 902 having an outer diameter dimensioned to fit within the support aperture 896 or 898, and may include a second portion 904 having a larger diameter and acting as a stop. The grommet 900 may be made of a nonconductive or dielectric material such as those described herein.

Referring to FIG. 15, depending on a particular application, two or more objects 4 and 6 may be tied together using, for example, ties 8. Object 6 is passed through one or more apertures 898 of the support stands 850 provided between point A and point B. Object 4 may rest on the recessed portion 886 of the one or more support stands provided between point A and point B. The objects 4 and 6 may then be tied together using one or more ties 8 as desired.

Figure 16:
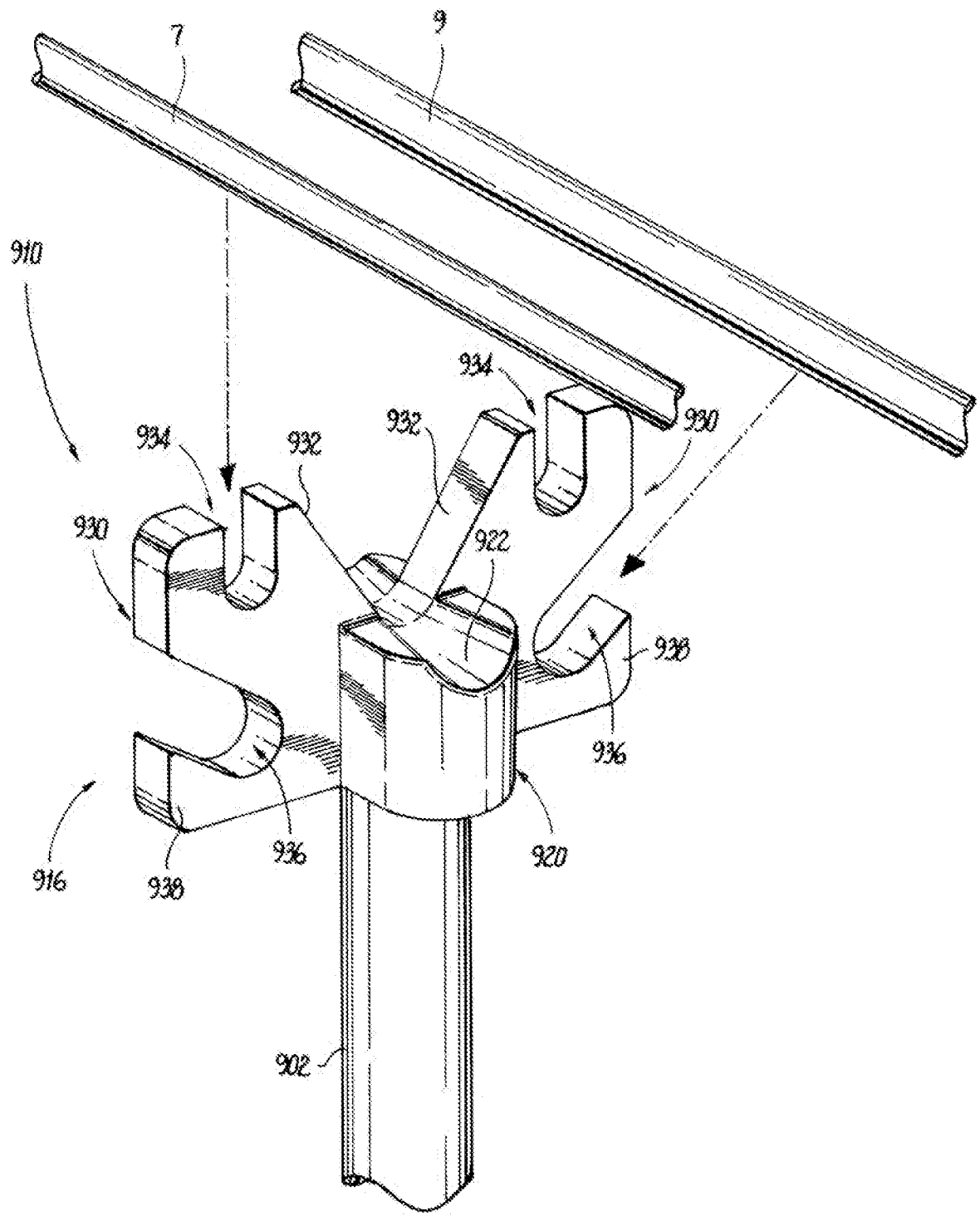
FIG. 16 is a perspective view of the saddle of another illustrative embodiment of the support stand according to the present disclosure, illustrating slots in the flanges of the support stand to support objects.

Referring to FIG. 16, a portion of a support stand according to another embodiment of the present disclosure is shown. The support stand 910 in this exemplary embodiment includes a pedestal 902, a base (not shown) and a saddle 916. The pedestal 902 may be may be similar to any of the pedestals and/or pedestal extensions described herein and may be attached to the saddle 916 in any of the manners described herein. The base may be similar to any of the bases described herein. In this exemplary embodiment, the saddle 916 includes a support member 920 and a pair of flanges 930 extending from the support member as shown. The support member 920 includes an orifice (not shown) formed in a lower portion of the support member to receive an upper portion of the pedestal 902 and a recessed portion 922 on an upper surface of the support member. The orifice is similar to the orifices described herein. Each flange 930 includes a diagonal edge 932 extending toward the recessed portion 922 of the support member 920. The diagonal edges 932 and recessed portion 922 serve to form a U-shaped, V-shaped or other shaped opening, and act as a guide for placement of objects on the support member 920. In place of or in addition to the support apertures described herein, each flange 930 may include one or more slots 934 and 936. The slots 934 may be a substantially U-shaped slot, V-shaped slot or other shape slot having an open end, as shown. The width of the slot 934 is configured and dimensioned to receive and support the desired object. For example, according to the embodiment depicted in FIG. 16, the slot 934 is configured and dimensioned to receive and support object 7. The slots 936 are formed at an angle to include an upwardly extending arm 938 so that an object, e.g., object 9, inserted into the slot 936 remains in the slot.

A support stand according to another illustrative embodiment of the present disclosure is shown in FIGS. 17-21 and is referred to generally as support stand 950. The support stand 950 may be made from any suitable non-conductive or dielectric material. Non-limiting examples of suitable non-conductive or dielectric materials used for forming the support stand 950 include concrete, polymer concrete, cementitious resins, fiberglass, fiberglass reinforced resins, plastics including PE (polyethylene), PVC (polyvinyl chloride) and other plastic compositions, etc.

The support stand 950 includes a pedestal 952, a base 960 and a saddle 970. The pedestal 952 may be a fixed length pedestal so that support stand 950 has a fixed height. When using fixed length pedestals, the fixed length pedestals may be provided in various heights allowing an end user to choose a pedestal 952 having a length suitable for a particular location and/or use of the support stand 950. Alternatively, the length of the pedestal 952 may be cut to a desired length at the work site so that the assembled support stand 950 is at the desired height. As another alternative, the pedestal 952 may include pedestal extensions to adjust the height of the pedestal 952 for a particular location and/or use of the support stand 950. The pedestal extensions may be similar to the pedestal extensions 860 shown in FIG. 12 and described herein. In the embodiment shown in FIGS. 17-21, the pedestal is a fixed length pedestal.

Figure 17:
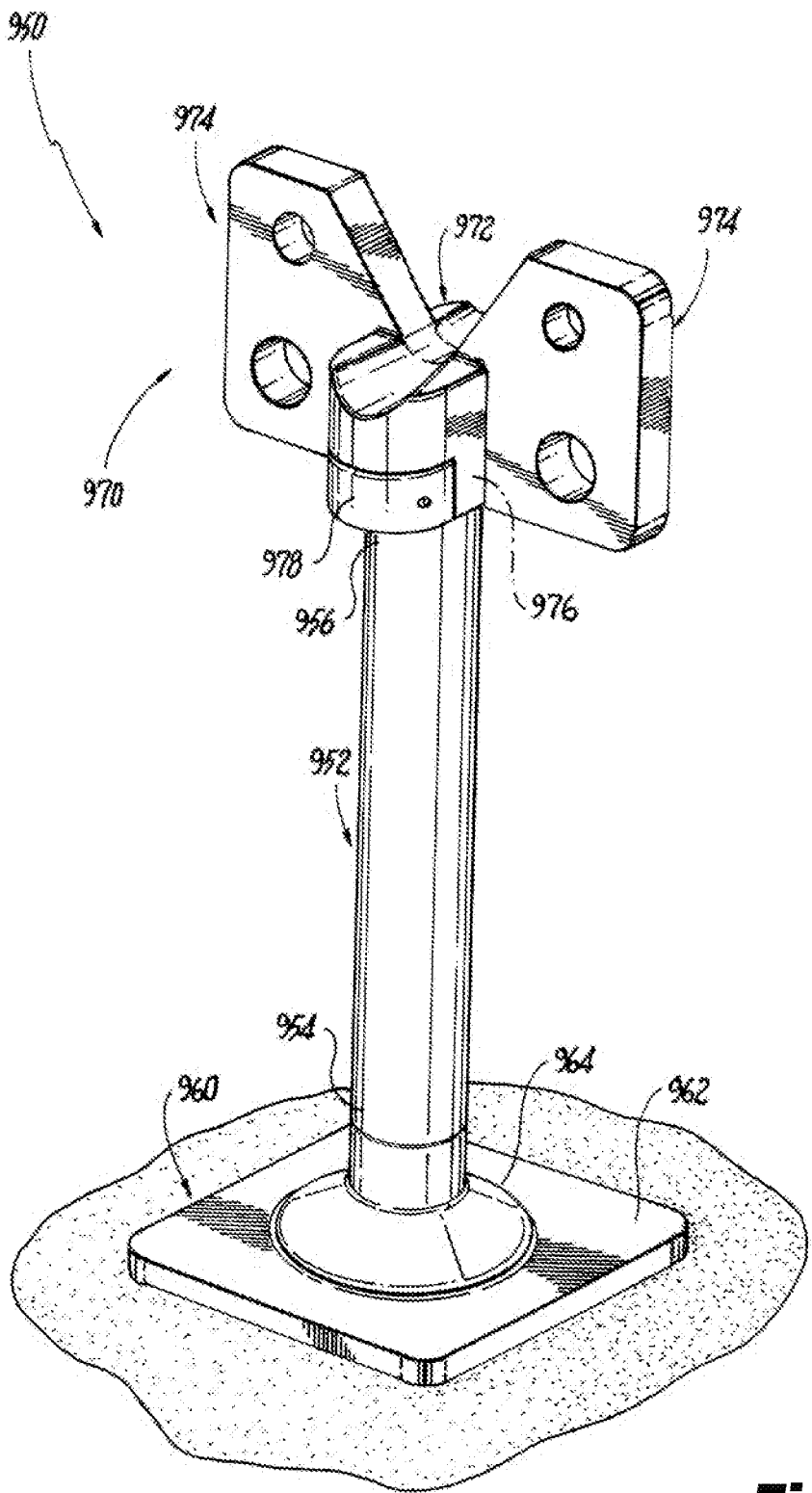
FIG. 17 is a perspective view of another illustrative embodiment of the support stand according to the present disclosure.

The base 960 may include a platform 962 providing a relatively large surface area contacting the ground or flooring and a raised end 964 extending from the platform 962, as seen in FIG. 17. In this illustrative embodiment, the raised end 964 of the base 960 is configured to be joined with, couple to or otherwise mated with end 954 of the pedestal 952 so that the base 960 can be removed from the pedestal 952 when shipping the support stand 950. In another illustrative embodiment, the raised end 964 of the base 960 may be molded with the pedestal to form a monolithic structure.

Figure 18:
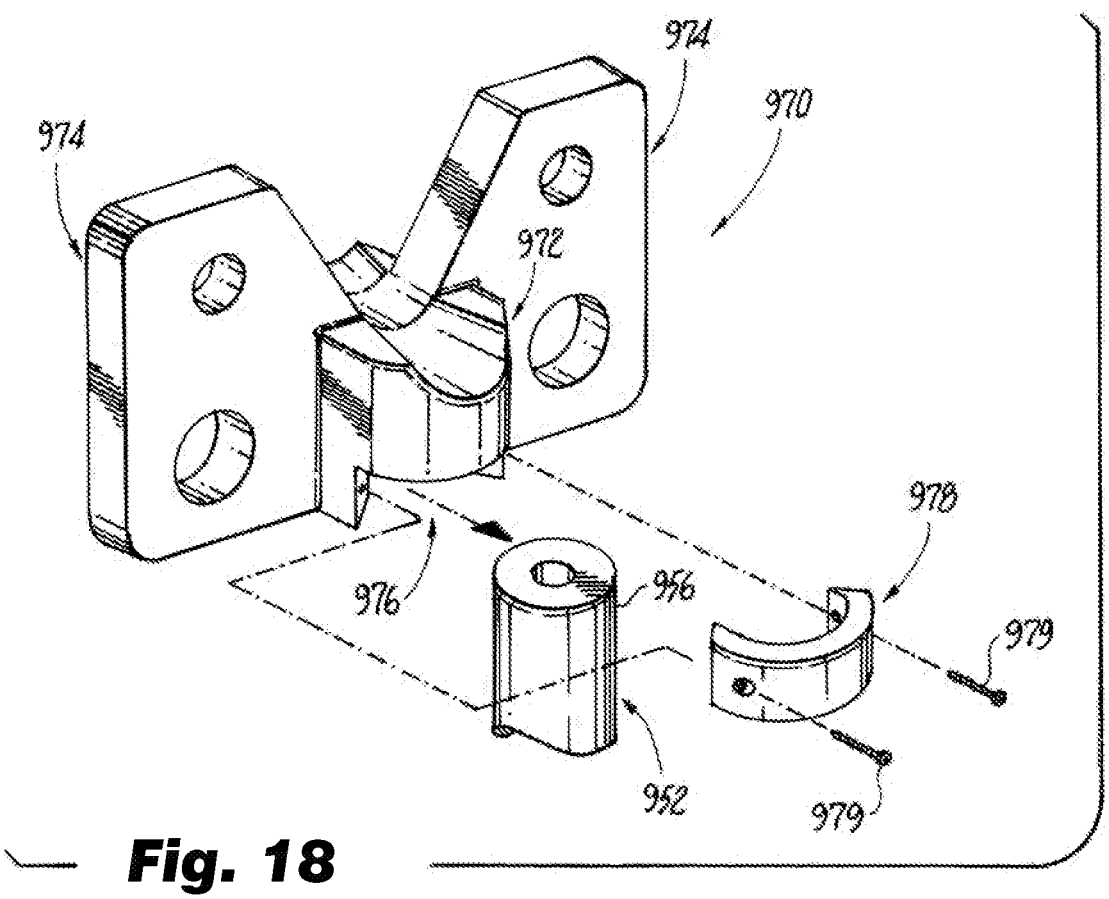
FIG. 18 is a perspective view with parts separated of a portion of the support stand of FIG. 17.
Figure 19:
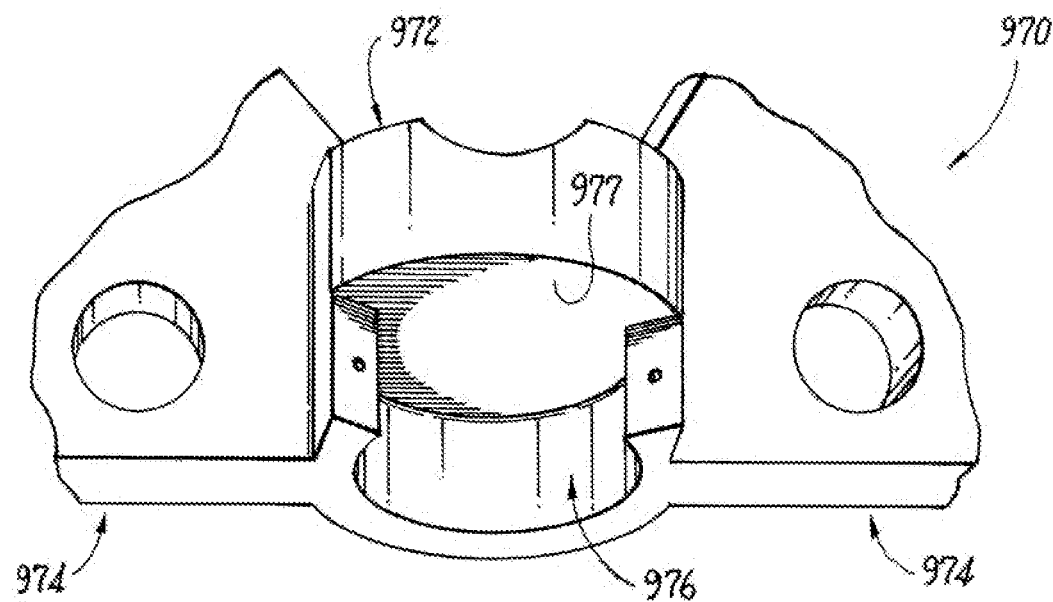
FIG. 19 is a bottom perspective view of a saddle of the support stand of FIG. 17.

Referring to FIGS. 17-19, the saddle 970 includes a support member 972 and one or more flanges 974 extending from the support member. The support member 972 includes an orifice 976 configured to receive an upper end 956 of the pedestal 952, as shown in FIG. 17. The orifice 976 ends within the support member 972 at a wall stop 977 such that when the orifice receives the upper end 956 of the pedestal 952, a top of the upper end 956 of the pedestal 952 contacts or bottoms-out at the wall stop 977. In this illustrative embodiment, the support member 972 includes a removable cap 978 that is removable secured to the support member 972 using, for example, mechanical fasteners 979, such as screws passing through holes in the cap 978 and into threaded holes, plugs or inserts positioned in the support member 972, as seen in FIG. 19. The cap 978 forms part of the orifice 976 in the support member 972 and when removed provides a window or access to the interior of the orifice 976, seen in FIG. 18. Access to the interior of the orifice 976 permits smaller scale height adjustments of the saddle 970 relative to the pedestal 952 using one or more shims 980, seen in FIG. 21, as described in more detail below. The support member 972 may include a recessed portion 982, seen in FIG. 17, that may be a curved recessed to conform to the shape of an object being supported by support member 950. However, the recessed portion 982 may have any shape that conforms to the object being supported, such as a rectangular or square shape, so that the object can rest on the saddle 970.

Figure 20:
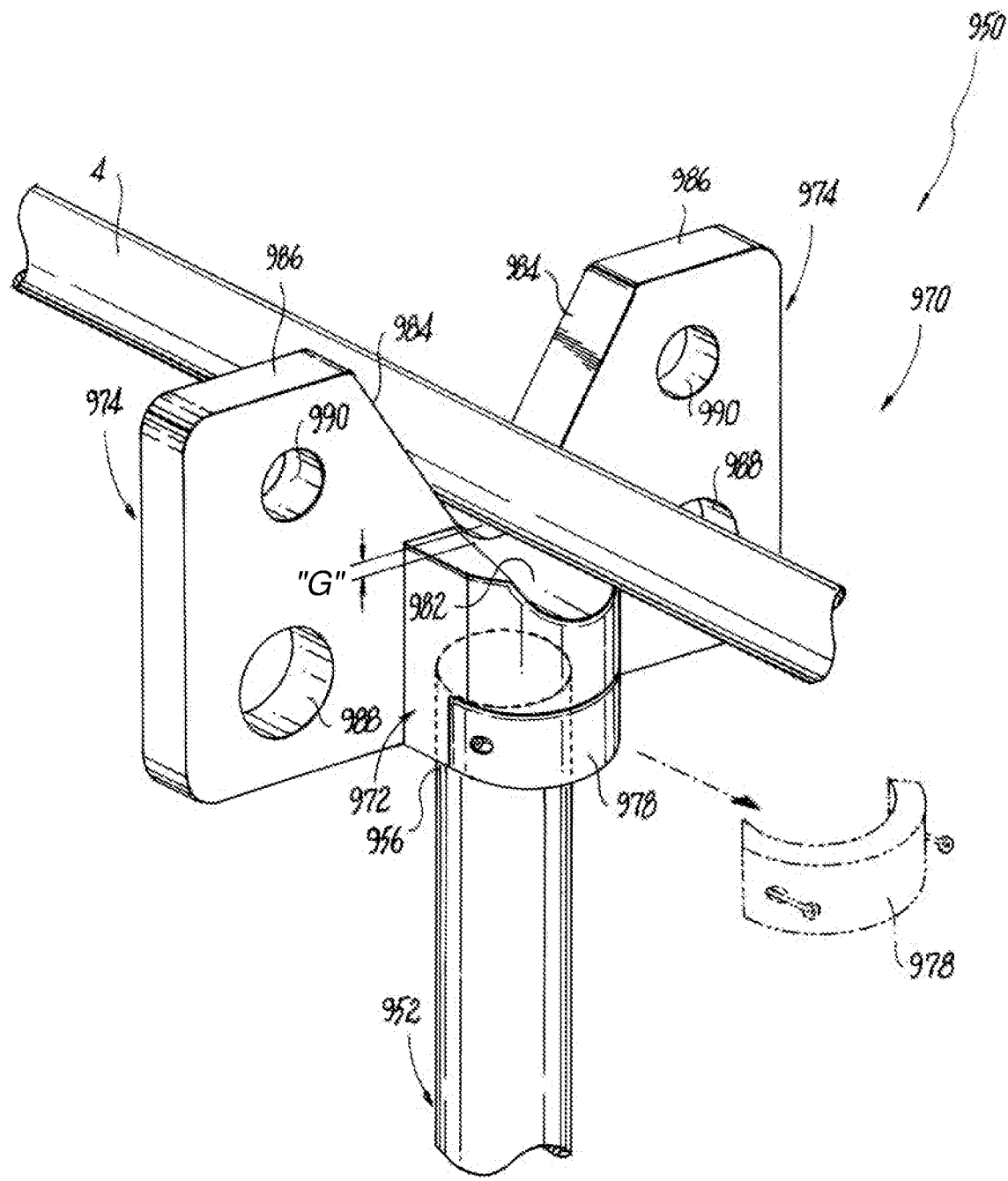
FIG. 20 is a perspective view of the support stand of FIG. 17, illustrating a gap between a pipe passing through the support stand and a saddle of the support stand.

Referring to FIGS. 17 and 20, each flange 974 includes an edge 984 extending diagonally from an upper edge 986 toward the recess portion 982 of the support member 972. The diagonal edges 984 and recessed portion 982 serve to form a U-shaped, V-shaped or other shaped opening, and act as a guide for placement of objects on the support member 950. The flanges 974 may be secured to the support member 972 using mechanical fasteners or adhesive fasteners, or the flanges 974 may be integrally formed into the support member 972 so that the flanges and support member are monolithically formed. Each flange 974 may include one or more support apertures 988 and 990 that can be used to support one or more objects. The support apertures 988 and 990 may have the same diameter or different diameters. In another illustrative embodiment, the flanges 974 may include one or more slots similar to slots 934 and 936 described above with reference to FIG. 16.

Figure 21:
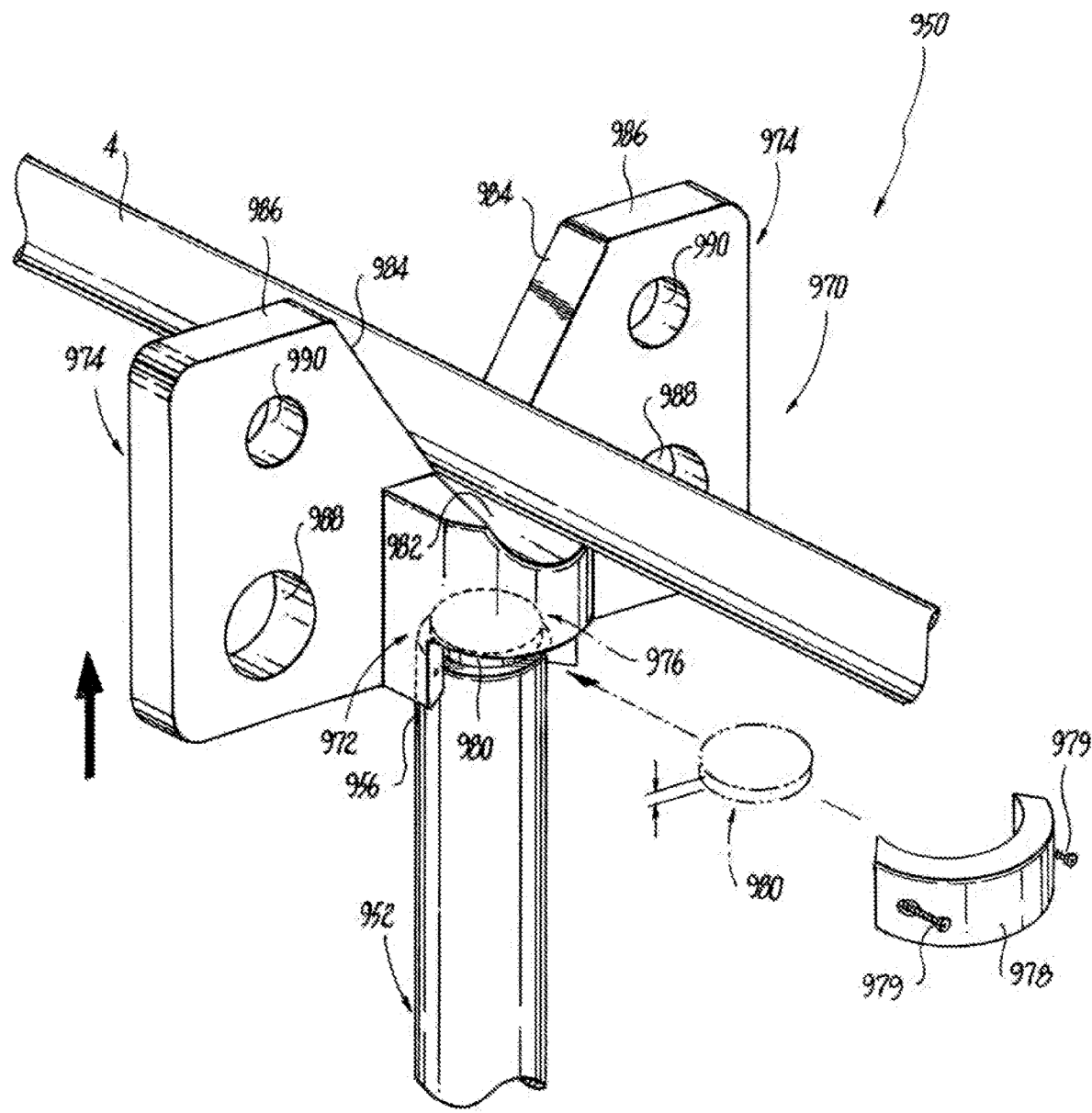
FIG. 21 is a perspective view of the support stand of FIG. 17, illustrating a cap removed from the saddle to expose a top portion of a pedestal, and a shim being inserted between the saddle and the top of the pedestal.

Referring to FIGS. 18 and 20-21, adjusting the height of the saddle 970 relative to the pedestal 952 will be described. In instances where there is a gap "G", seen in FIG. 20, between the support member 972 of the saddle 970 and the object 4 to be supported by the support stand 950, the saddle 970 may have to be raised so that the object 4 rests on the recess portion 982 of the support member 972. To raise the height of the saddle 970, the cap 978 is removed from the support member 972 by removing the screws 979 securing the cap to the support member 972, as shown in FIG. 18. With the cap 978 removed, access to the interior of the orifice 976 is provided such that the saddle 970 can be lifted or horizontally removed from pedestal 952 and one or more shims 980 can be placed on the top of the pedestal 952. The saddle 970 can be lowered or horizontally repositioned on the pedestal 952 and the one or more shims 980, as shown in FIG. 21. With the wall stop 977 of the support member 972 of the saddle 970 resting on the one or more shims 980, the cap 978 is re-attached to the support member. At this point, the gap "G" has been eliminated and the object 4 is resting on the recessed portion 982 of the support member 972 as shown in FIG. 21. It is noted that the one or more shims 980 may be made from any suitable non-conductive or dielectric material. Non-limiting examples of suitable non-conductive or dielectric materials used for forming the shims 980 include concrete, polymer concrete, cementitious resins, fiberglass, fiberglass reinforced resins, plastics including PE (polyethylene), PVC (polyvinyl chloride) and other plastic compositions, etc.

As shown throughout the drawings, like reference numerals designate like or corresponding parts. While illustrative embodiments of the present disclosure have been described and illustrated above, it should be understood that these are exemplary of the disclosure and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. A support stand for supporting objects, the support stand comprising:
 a pedestal having a first end and a second end;
 a pedestal extension member configured to vertically extend the pedestal, the pedestal extension member having a first end and a second end, the second end of pedestal extension member being releasably secured to the first end of the pedestal;
 a saddle having a support member that includes an orifice with a removable cap, wherein the first end of the pedestal extension member is at least partially positioned in the orifice; and
 a base attached to the second end of the pedestal;
 wherein the pedestal, pedestal extension member, saddle and base are formed of at least one of concrete, polymer concrete, cementitious resins, fiberglass reinforced resins.

2. The support stand according to claim 1, wherein the saddle includes at least one flange extending from the support member.

3. The support stand according to claim 2, wherein the at least one flange includes a plurality of apertures therethrough.

4. The support stand according to claim 1, wherein the removable cap when removed provides access to an interior of the orifice.

5. The support stand according to claim 1, wherein the support member includes a recess portion configured to receive an object.

6. The support stand according to claim 5, wherein the at least one flange extending from the support member includes at least one aperture for passing one or more objects through the at least one aperture such that the one or more objects extend parallel to the recess portion of the support member.

7. The support stand according to claim 1, further comprising at least one shim positioned between a top of the first end of the pedestal extension member and the support member.

8. The support stand according to claim 1, wherein the saddle is rotatable relative to the pedestal extension member.

9. The support stand according to claim 1, wherein the base is fixedly attached to the second end of the pedestal.

10. The support stand according to claim 1, wherein the base is removably attached to the second end of the pedestal.

11. The support stand according to claim 10, wherein the base comprises a female portion dimensioned to receive a corresponding male portion extending from the pedestal to removably attached the base to the pedestal.

12. The support stand according to claim 10, wherein the base comprises a male portion extending from the base dimensioned to be received in a corresponding female portion in the pedestal to removably attached to base to the pedestal.

13. A support stand for supporting objects, the support stand comprising:
 a pedestal having a first end and a second end;
 a saddle having a support member a plurality of flanges extending from the support member, the support member having an orifice adapted to receive the first end of the pedestal and a removable cap that forms part of the orifice and when removed provides access to an interior of the orifice; and
 a base attached to the second end of the pedestal;
 wherein the pedestal, saddle and base are formed of at least one of concrete, polymer concrete, cementitious resins, fiberglass reinforced resins.

14. The support stand according to claim 13, further comprising a pedestal extension member positioned between the support member and the first end of the pedestal and configured to vertically extend the pedestal, the pedestal extension member having a first end positioned in the orifice of the support member and a second end removably attached to the first end of the pedestal.

15. The support stand according to claim 13, wherein the support member includes a recess portion configured to receive an object.

16. The support stand according to claim 15, wherein each of the plurality of flanges includes at least one aperture extending therethrough for passing one or more objects through the at least one aperture such that the one or more objects extend parallel to the recess portion of the support member.

17. The support stand according to claim 13, further comprising at least one shim positioned in the orifice between a top of the first end of the pedestal and the support member.

* * * * *